(12) United States Patent
Clark, Jr. et al.

(10) Patent No.: US 7,471,447 B1
(45) Date of Patent: Dec. 30, 2008

(54) DEVICE AND METHOD FOR REDUCING PUMP LASER INSTABILITY DUE TO AMPLIFIED RAYLEIGH SCATTERING FEEDBACK

(75) Inventors: Thomas R. Clark, Jr., Columbia, MD (US); Antonios A. Seas, Ellicott City, MD (US); Michael L. Dennis, Ellicott City, MD (US); Roger Dorsinville, Teaneck, NJ (US); William Shieh, Clarksville, MD (US)

(73) Assignee: Broadwing Corporation, Austin, TX (US)

( * ) Notice: Subject to any disclaimer, the term of this patent is extended or adjusted under 35 U.S.C. 154(b) by 749 days.

(21) Appl. No.: 10/888,652

(22) Filed: Jul. 9, 2004

Related U.S. Application Data

(60) Provisional application No. 60/486,093, filed on Jul. 11, 2003.

(51) Int. Cl.
*H04B 10/17* (2006.01)
*H04B 10/12* (2006.01)

(52) U.S. Cl. .................................... 359/334; 359/341.3
(58) Field of Classification Search ................. 359/334, 359/341.3
See application file for complete search history.

(56) References Cited

U.S. PATENT DOCUMENTS

| | | | |
|---|---|---|---|
| 5,241,414 A * | 8/1993 | Giles et al. ............. | 359/341.33 |
| 6,510,000 B1 * | 1/2003 | Onaka et al. ................. | 359/334 |
| 6,618,195 B2 | 9/2003 | Shieh et al. | |
| 6,633,712 B2 | 10/2003 | Ramanujam et al. | |
| 6,741,389 B2 * | 5/2004 | Kumasako et al. .......... | 359/334 |
| 6,775,057 B2 * | 8/2004 | Akasaka et al. .......... | 359/337.5 |
| 6,894,831 B2 * | 5/2005 | Shieh et al. ............. | 359/341.32 |
| 6,977,769 B2 * | 12/2005 | Matsushita et al. .......... | 359/334 |
| 2002/0141698 A1 * | 10/2002 | Matsushita et al. ............. | 385/31 |
| 2003/0095323 A1 * | 5/2003 | Onaka et al. ................. | 359/334 |
| 2003/0128419 A1 * | 7/2003 | Alaruri et al. ............. | 359/341.3 |

OTHER PUBLICATIONS

Y. Emori, "100 nm bandwidth flat-gain Raman amplifiers pumped and gain-equalized by 12-wavelength channel WDM Diode Unit," Electronic Letters, vol. 35, No. 16, p. 1355 (1999).
F. Koch et. al., "Broadband gain flattened Raman amplifier to extend operation in the third telecommunication window," Optical Fiber Communication Conference, vol. 4, pp. 103-105, (2000).

(Continued)

*Primary Examiner*—Eric Bolda
(74) *Attorney, Agent, or Firm*—Thorp Reed & Armstrong, LLP

(57) ABSTRACT

A device and method for reducing amplified Rayleigh backscatter at a Raman pump. A pump assembly for an optical amplifier includes a set of pump radiation sources for Raman pumping an optical transmission span. Each pump radiation source is adapted to produce radiation having a pump wavelength and a pump power. The optical transmission span is adapted to provide Raman amplification of an optical data signal when pumped by the set of pump radiation sources. At least one optical isolator is selectively located between at least one selected pump radiation source and the optical transmission span to reduce amplified Rayleigh backscatter at the pump wavelength of the selected pump radiation source from feeding back into the selected at least one pump radiation source.

17 Claims, 21 Drawing Sheets

OTHER PUBLICATIONS

P.B. Hansen, et al., High sensitivity 1.3 μm optically pre-amplified receiver using Raman amplification, Electronic Letters, vol. 32, No. 23, p. 2164-2165 (1996).

P.B. Hansen, et al., "Unrepeatered WDM transmission experiment with 8 channels of 10 Gb/s over 352 km", IEEE Photonics Technology Letters, vol. 8, pp. 1082-1084 (1996).

S.N. Knudsen, et al., "New dispersion-slope managed fiber pairs for ultra long haul transmission systems", Technical Proceedings of National Fiber Optic Engineers Comference, pp. 1599-1607, (2001).

S.N. Knudsen, et al, "Optimisation of dispersion compensating fibres for cabled long-haul applications", Electronics Letters, vol. 36, No. 25, (2000).

* cited by examiner

DEVICE AND METHOD FOR REDUCING PUMP LASER INSTABILITY DUE TO AMPLIFIED RAYLEIGH SCATTERING FEEDBACK

CROSS-REFERENCE TO RELATED APPLICATIONS

This application claims priority from U.S. Provisional Patent Application No. 60/486,093, filed Jul. 11, 2003, which is incorporated by reference herein.

STATEMENT REGARDING FEDERALLY SPONSORED RESEARCH AND DEVELOPMENT

Not Applicable.

FIELD OF THE INVENTION

This invention relates to optical communications and specifically to a device and method for reducing pump laser instability due to amplified Rayleigh scattering feedback.

BACKGROUND OF THE INVENTION

Over the past decade, long-haul data transmission capacity has greatly expanded. Wavelength division multiplexing (WDM) increases bandwidth in optical communications by providing for communication over several wavelengths or channels. For long haul optical communications the optical signal must be periodically amplified. To maximize WDM capacity, it is desirable that the optical bandwidth of the system be as wide as possible. Raman amplification is one of the amplification schemes that can provide a broad and relatively flat gain profile over the wavelength range used in WDM optical communications. (See Y. Emori, "100 nm bandwidth flat-gain Raman Amplifiers pumped and gain-equalized by 12-wavelength channel WDM Diode Unit," Electronic Lett., Vol. 35, no 16, p. 1355 (1999) and F. Koch et. al., "Broadband gain flattened Raman Amplifiers to extend to the third telecommunication window," OFC '2000, Paper FF3, (2000)). Raman amplifiers may be either distributed or discrete (See High Sensitivity 1.3 μm Optically Pre-Amplified Receiver Using Raman Amplification," Electronic Letters, vol. 32, no. 23, p. 2164 (1996)). The Raman gain material in distributed Raman amplifiers is the transmission optical fiber, while a special spooled gain fiber is typically used in discrete Raman amplifiers.

Raman amplifiers use stimulated Raman scattering to amplify a signal at a signal wavelength. In stimulated Raman scattering, radiation power from a pump radiation source is transferred to an optical signal to increase the power of the optical signal. The frequency (and therefore photon energy) of the radiation emitted by the pump radiation source is greater than the frequency of the radiation of the optical signal. This down shift in frequency from the pump frequency to the signal radiation frequency is due to the pump light interaction with optical phonons (vibrations) of the Raman gain material, i.e., the medium through which the pump radiation and the optical signal are traversing.

The Raman gain material in Raman amplifiers can be the transmission optical fiber itself. The Raman gain coefficient for a silica glass fiber (such as are typically used in optical communications) is shown in FIG. 1 as a function of the wavelength shift relative to a pump wavelength of about 1400 nm. As can be seen, the largest gain occurs at about a 100 nm shift. Thus, the maximum gain for a single pump wavelength of about 1400 nm will occur at a signal wavelength of about 1500 nm. Since the optical gain is proportional to the pump intensity, the gain of the signal of a Raman amplifier is the product of the Raman gain coefficient and the pump intensity.

The gain profile having a typical bandwidth of 20-30 nm for a single pump wavelength is too narrow for WDM optical communications applications where a broad range of wavelengths must be amplified. To broaden the gain profile, Raman amplifiers employing multiple pump wavelengths over a broad wavelength range have been suggested for use in WDM optical communication applications. For example, it has been suggested to use twelve pump wavelengths to achieve a 100 nm bandwidth Raman amplifier.

In order for a flat gain profile to be achieved, the pump-pump interactions generally require that the shorter pump wavelengths have a higher pump power than the longer pump wavelengths. This is so because energy from the shorter wavelength (higher photon energy) pumps is transferred to the longer wavelength pumps due to stimulated Raman scattering. To compensate for the pump-pump energy loss at shorter wavelengths, the shorter pump wavelengths should have increased power.

A typical pump power-pump wavelength scheme to achieve a relatively flat and broad Raman gain profile is illustrated in FIG. 2 for the case of twelve pump wavelengths. As can be seen in FIG. 2, the pump power decreases for increasing wavelength. Also, the spacing between wavelengths is closer for shorter wavelengths. FIG. 3 illustrates a relatively flat and broad Raman gain profile for a pump power-pump wavelength scheme similar to that of FIG. 2. The variations on the gain spectrum result in channel-to-channel variation in the optical-signal-to-noise-ratio (OSNR) and absolute signal power. Because system performance is limited by the OSNR of the worst performing wavelength, a large variation can severely limit system length. The maximum difference of the gain within the spectral range of signals is called gain ripple. The gain ripple of an amplifier should be as small as possible. This can be achieved by properly selecting the pump wavelengths and powers of the Raman amplifier. As can be seen in FIG. 3, the gain ripple over the wavelength range of 1520 to 1620 nm is smaller than 1.5 dB.

FIG. 4 is a schematic of a typical optical communication system using Raman amplifiers for periodic amplification of the optical signal. The system includes transmitter terminal 10 and receiver terminal 12. The transmitter terminal includes a number of optical communication transmitters 14a, 14b, ... 14z respectively transmitting signals at optical communications wavelengths λa, λb, ... λz.

The optical signals are multiplexed by multiplexer 16 and are amplified by a series of amplifiers A1, A2, ... An. The signals are transmitted from the transmitter 10 to the amplifiers, between the amplifiers, and from the amplifiers to the receiver 12 via transmission optical fiber 26. For distributed Raman amplification, the optical amplifier will also include transmission optical fiber. The optical signals are then demultiplexed by demultiplexer 18 of receiver 12 to respective optical communications receivers 20a, 20b, ... 20z. The demultiplexer 18 sends optical communications wavelengths λa, λb, ... λz to respective optical communications receivers 20a, 20b, ... 20z.

Although FIG. 4 shows signals directed from transmitter terminal 10 to receiver terminal 12 for ease of illustration, in general the transmitter terminal 10 and receiver terminal 12 are typically transmitter/receiver terminals for bidirectional communication. In this case each of the transmitter/receiver terminals will have transmitters as well as receivers and both a multiplexer and demultiplexer.

FIG. 5 is a schematic of a typical distributed Raman optical amplifier 50 employed as one of the amplifiers in the series of amplifiers A1, A2, . . . An in the system of FIG. 4. The amplifier 50 includes optical pump assembly 51 (shown enclosed by dashed lines) and transmission fiber 64. In this amplification scheme, the pump assembly 51 includes a pump radiation source 52 that provides, for example, twelve different pump wavelengths λ1 through λ12. Specifically, the pump radiation source 52 comprises twelve lasers 56 that each emit radiation at a different wavelength of the wavelengths λ1 through λ12. The radiation from the individual radiation sources 56 of the pump radiation source 52 are then coupled or combined at pump radiation combiner 54, and the coupled radiation is output at pump radiation combiner output 58.

The coupled radiation has a coupled radiation profile that is a combination of the individual radiation profiles of the radiation input into the pump radiation combiner 54. The pump radiation profile, that will be coupled with the optical signal to be amplified, is therefore the coupled radiation profile in this case. Thus, the pump radiation profile is output from output 58. The pump radiation profile from output 58 is then coupled at pump-signal combiner 60 with the optical signal 62. Optical signal 62, i.e., the data signal, propagates in the transmission optical fiber 64 in a direction opposite to the radiation of the pump radiation profile. The optical signal is amplified along transmission optical fiber 62. Thus, the amplifier 50 and pump assembly 51 provide amplification for a single optical transmission path.

Overall, in long haul applications, transmission capacity is ultimately limited by the interplay of many possible transmission impairments (i.e., the degradation of fidelity of the optical data carrier signal) caused by several fundamental physical phenomena, including attenuation, Rayleigh scattering, dispersion, and optical nonlinearity of the fiber.

In addition to the use of amplification to reduce signal attenuation, to compensate for many of the above impairments over a long-haul fiber, dispersions maps have been employed, where the long haul fibers employ different types of optical fibers arranged in a way to compensate for dispersion and other impairments, as is described in commonly owned U.S. Pat. No. 6,633,712, issued Oct. 14, 2003, entitled "METHOD AND SYSTEM FOR DISPERSION MAPS AND ENHANCED DISTRIBUTED GAIN EFFECT IN LONG HAUL TELECOMMUNICATIONS", which is incorporated herein by reference in its entirety.

SUMMARY OF THE INVENTION

It would be desirable to provide an optical amplifier, such as a Raman amplifier, including a pump assembly that could amplify optical signals along an optical transmission path, while reducing the effects of pump laser instability due to amplified Rayleigh scattering feedback. It would also be desirable to provide an optical amplifier, such as a Raman amplifier, including a pump assembly that could amplify optical signals along several optical transmission paths, while reducing the effects of pump laser instability due to amplified Rayleigh scattering feedback. It would further be desirable to amplify along several dispersion mapped optical transmission spans with the same set of radiation sources, such as lasers, which provide stable operation, in a manner that allows for increased pump source redundancy without increasing the number of pump sources per optical transmission path amplified.

According to one embodiment of the invention there is provided a pump assembly for an optical amplifier that includes a set of pump radiation sources for Raman pumping an optical transmission span. Each pump radiation source is adapted to produce radiation having a pump wavelength and a pump power. The optical transmission span is adapted to provide Raman amplification of an optical data signal when pumped by the set of pump radiation sources. At least one optical isolator is selectively located between at least one selected pump radiation source and the optical transmission span to reduce amplified Rayleigh backscatter at the pump wavelength of the selected pump radiation source from feeding back into the selected at least one pump radiation source.

According to another embodiment of the invention there is provided an amplifier unit for an optical network. The amplifier unit is coupled to a plurality of optical transmission spans. The amplifier unit includes a first pump assembly that includes a first pump assembly sub-group. The first pump assembly sub-group includes a first set of pump radiation sources for Raman pumping the plurality of optical transmission spans, where each pump radiation source is adapted to produce radiation having a pump wavelength and a pump power, and where the optical transmission spans are adapted to provide Raman amplification of propagating optical data signals when pumped by the set of pump radiation sources. The amplifier further includes a first optical isolator selectively located within the first pump assembly sub-group between at least one selected pump radiation source and the optical transmission spans to reduce amplified Rayleigh backscatter at the pump wavelength of the selected pump radiation source from feeding back into the selected at least one pump radiation source. The selective location is based on at least one of the wavelength of the selected pump source to be isolated and a Rayleigh backscatter coefficient of the optical transmission spans.

According to another embodiment of the invention there is provided a method of amplifying an optical signal along an optical transmission span. The method includes providing a first pump assembly that includes a first pump assembly sub-group, where the first pump assembly sub-group includes a first set of pump radiation sources for Raman pumping the optical transmission span, where each pump radiation source is adapted to produce radiation having a pump wavelength and a pump power, and where the optical transmission span is adapted to provide Raman amplification of a propagating optical data signal when pumped by the set of pump radiation sources. The method further includes selectively disposing a first optical isolator at a first selective location within the first pump assembly sub-group between at least one selected pump radiation source and the optical transmission spans to reduce amplified Rayleigh backscatter at the pump wavelength of the selected pump radiation source from feeding back into the selected at least one pump radiation source. The selective location is based on at least one of the wavelength of the selected pump source to be isolated, an estimated return loss for the optical transmission span, the length of the optical transmission span, the gain of the optical transmission span, and a Rayleigh backscatter coefficient of the optical transmission span. The method also includes providing an output pump from the first pump assembly and amplifying the optical data signal by coupling the output pump with the optical data signal.

The present invention provides for optical systems with increased reliability and lower monetary and real estate costs, because it eliminates the need to isolate all radiation sources used in an optical amplifier. Further features and advantages of the invention, as well as the structure and operation of various embodiments of the invention, are described in detail below with reference to the accompanying drawings.

DETAILED DESCRIPTION OF THE EMBODIMENTS

The present invention allows for coupling a pump assembly to one or more fiber transmission paths, with improved pump laser stability due to the reduction of feedback caused by amplified Rayleigh backscattering.

As the inventors have discovered, Rayleigh backscatter occurs when an optical transmission span, in particular a transmission span that is dispersion compensated, such as the three-segment maps that are described below, is backward pumped for Raman amplification. Rayleigh scattering is the scattering of light by objects which are small in comparison to the wavelength of the incident light. When backward pumping a fiber, e.g., a dispersion compensated fiber span, especially a span that includes an inverse dispersion fiber (IDF), backscattering that is amplified in the higher Raman gain fiber segment(s) can cause deleterious feedback at the Raman pump source. This deleterious feedback has been measured to cause about a 0.5% or greater fluctuation in output power at a pump source. This amplified Rayleigh backscatter-based feedback can further cause a pump source to change output wavelength, which can affect the gain profile of the transmission span.

In accordance with the teachings described herein, a telecommunications system and/or transmission span can be designed to reduce or eliminate this feedback (and associated pump power fluctuations) by selecting an appropriate number (e.g., one or more) of optical isolators and an appropriate location for the optical isolator(s) within a Raman pump assembly. Specific embodiments are described below in which selectively placed optical isolator(s) can be implemented in one or more pump assemblies and telecommunications systems utilizing Raman amplification.

Figure 1:
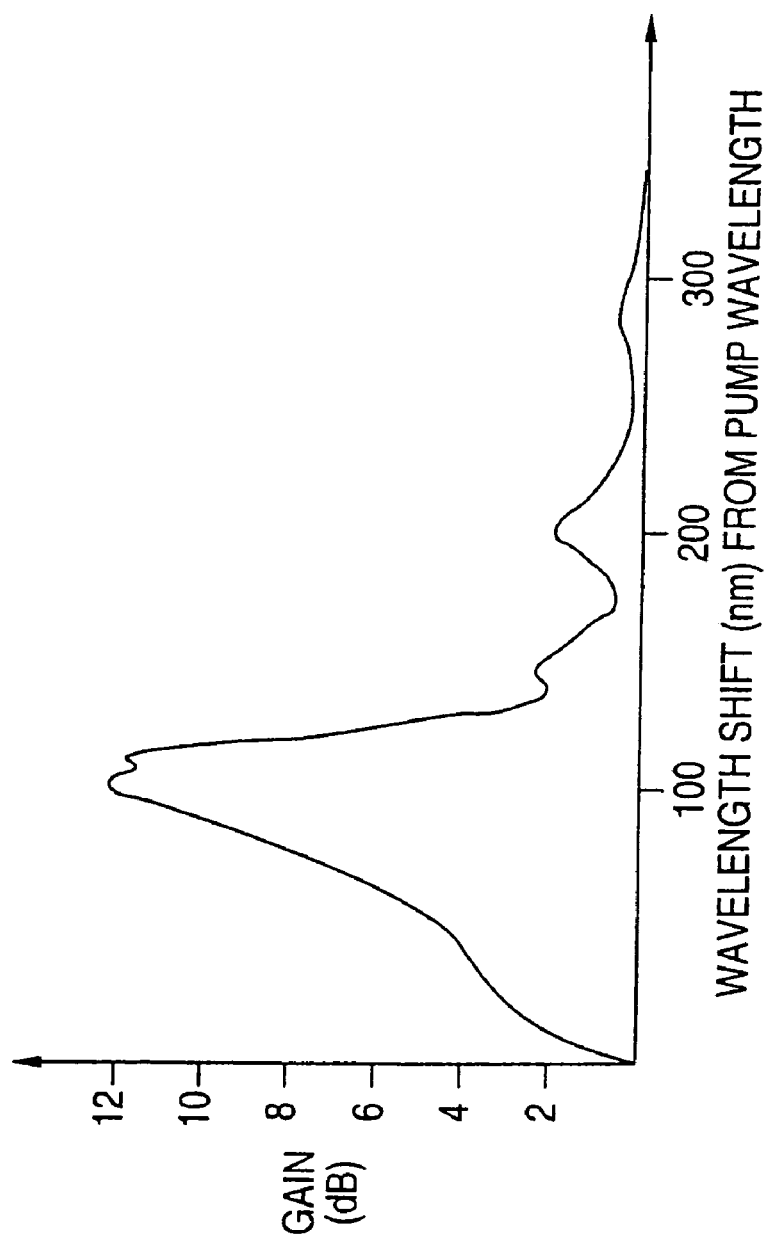
FIG. 1 is a graph showing the Raman gain coefficient as a function of wavelength shift from a pump wavelength for a silica glass fiber.
Figure 2:
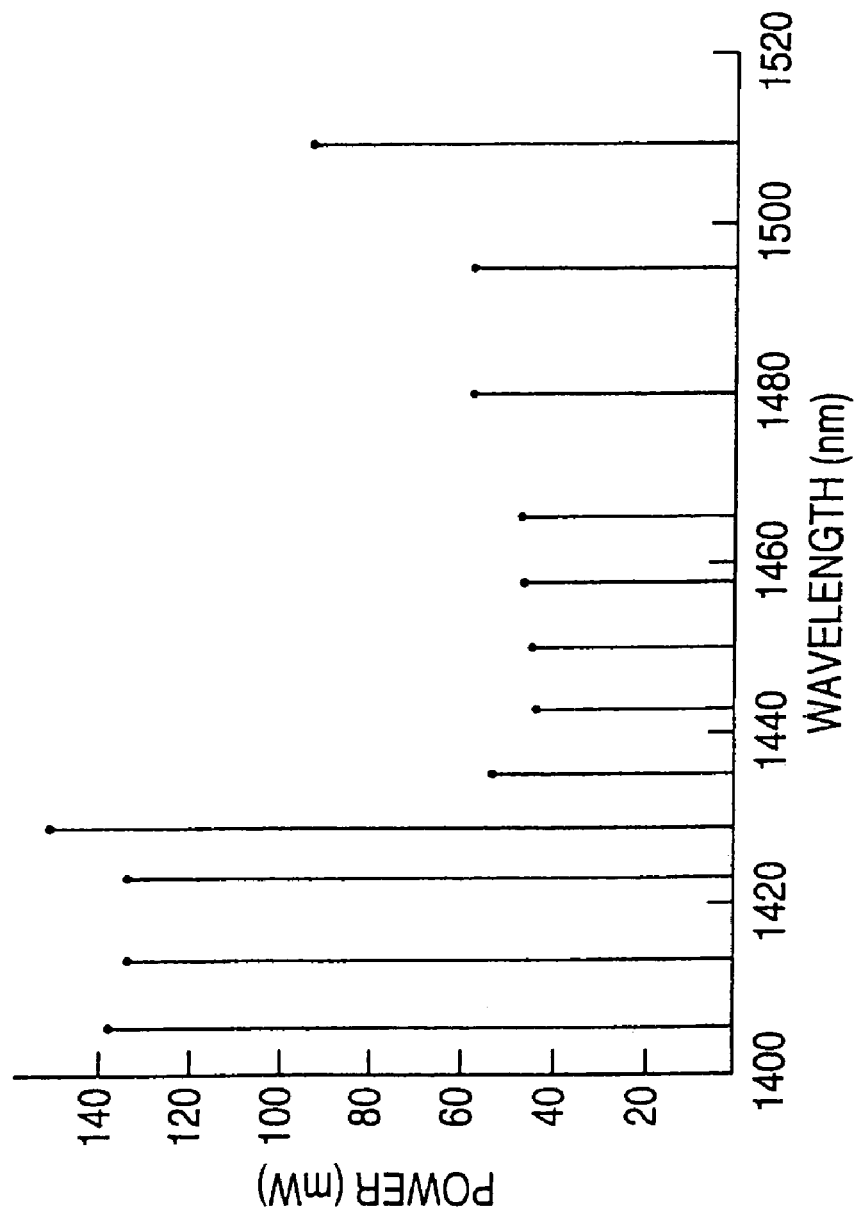
FIG. 2 shows a typical pump power-pump wavelength scheme.
Figure 3:
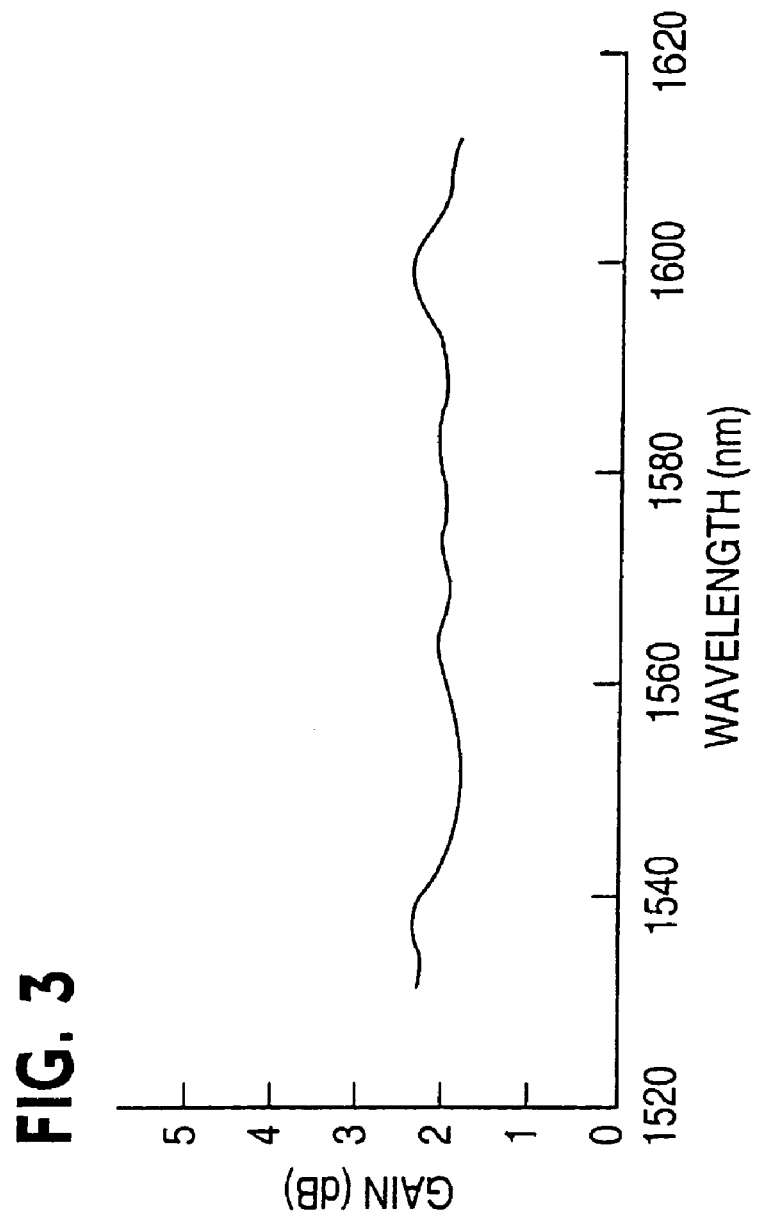
FIG. 3 illustrates the Raman gain profile for a pump power-pump wavelength scheme similar to that of FIG. 2.
Figure 4:
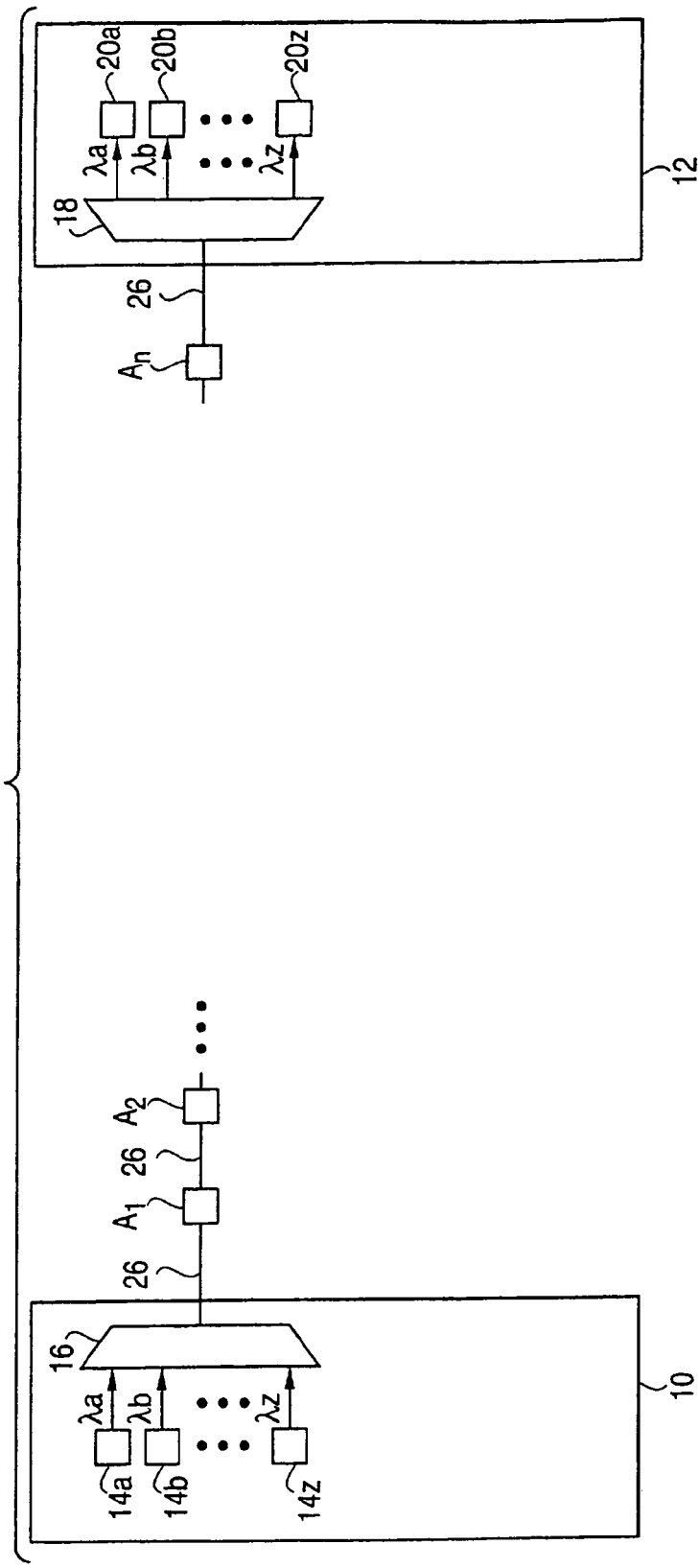
FIG. 4 is a schematic of a conventional optical communication system using Raman amplifiers for periodic amplification of the optical signal.
Figure 5:
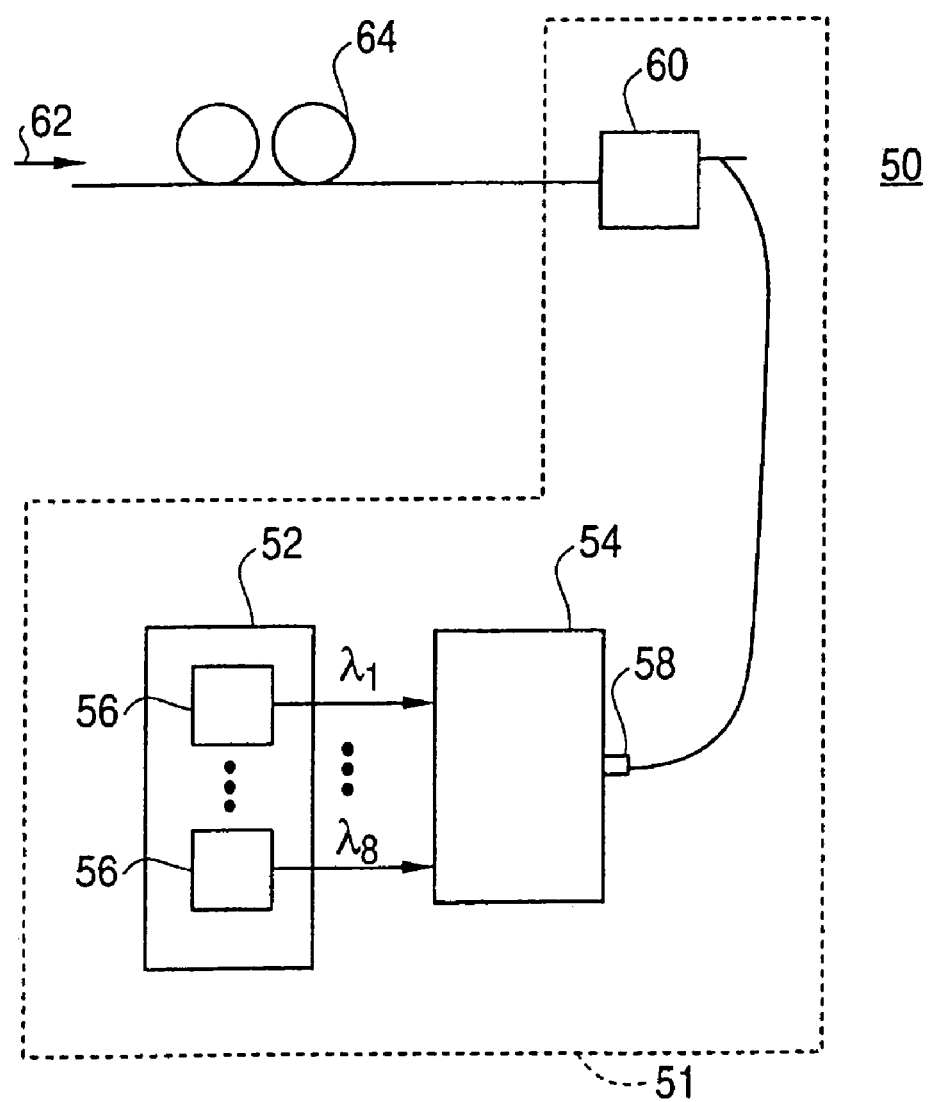
FIG. 5 is a schematic of a conventional amplifier employed in the optical communication system of FIG. 4.
Figure 6:
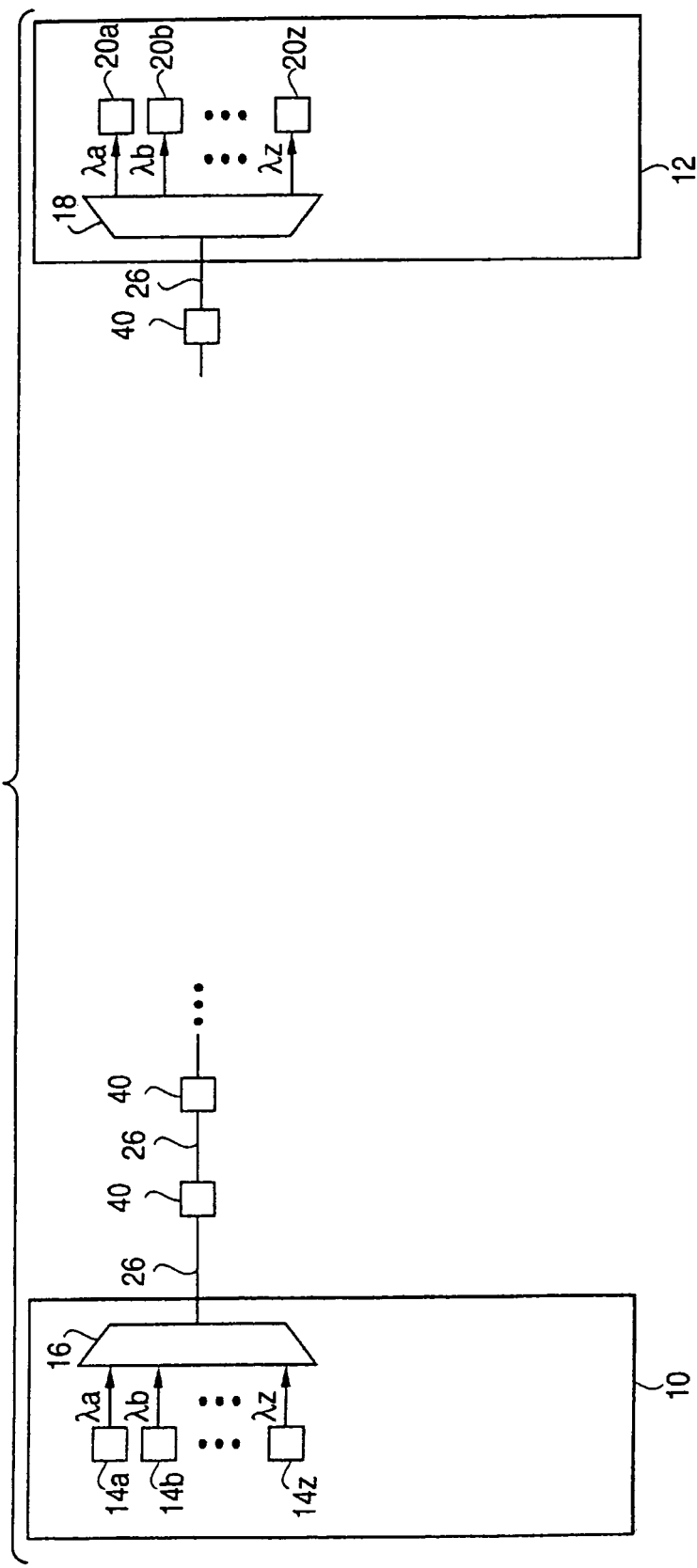
FIG. 6 is a schematic of an optical amplification system that can utilize the device and method of the present invention.
Figure 13:
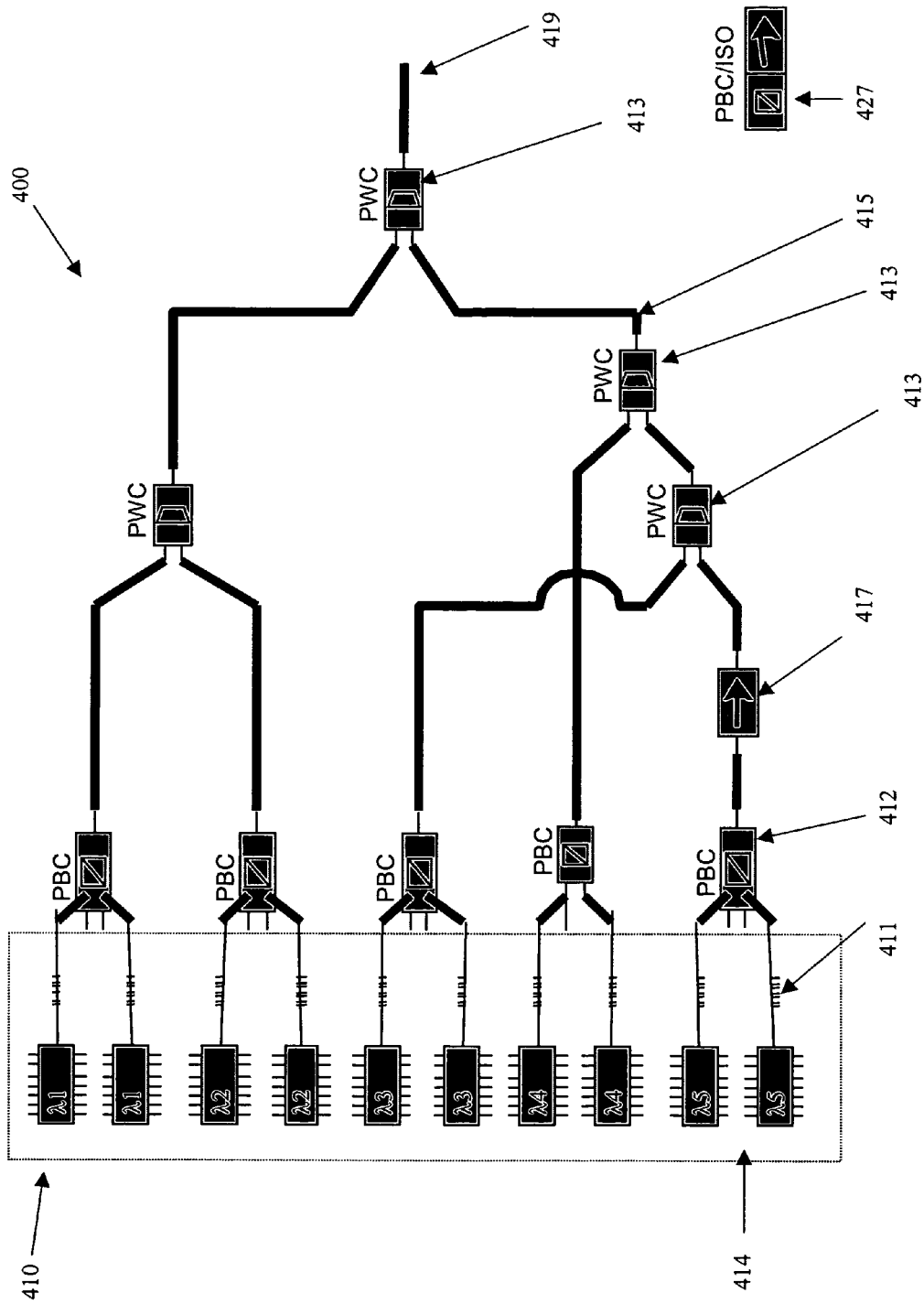
FIG. 13 is a pump assembly sub-group according to one embodiment of the invention.

FIG. 13 is a schematic of a pump assembly sub-group 400 according to one aspect of the present invention that can be implemented in a pump assembly (such as pump assembly 101 shown in FIG. 7 below) and within a telecommunications system (such as shown in FIG. 6 below). In accordance with the features and inventor discoveries described herein, pump assembly sub-group 400 can be used to improve Raman pump laser stability due to the reduction of feedback caused by amplified Rayleigh backscattering that occurs in a transmission span of a telecommunications system.

Pump assembly sub-group 400 can comprise a complete pump assembly for a Raman amplifier, or it can be part of multiple sub-groups that comprise a pump assembly for a Raman amplifier. As shown in FIG. 13, pump assembly sub-group 400 includes a number N of pump radiation sources 410 optically coupled to respective pump radiation combiners 412, 413. In this embodiment, the number of pump radiation sources is ten. As described further below, the number of individual pump sources can be greater or less than the specific example shown in FIG. 13. In one aspect depicted in FIG. 13, pump sources, such as pump source pairs 414, can be provided at each of wavelengths $\lambda 1$-$\lambda 5$, with a first pump source (e.g., radiation emitter) of the pair being polarized orthogonal to the second pump source of the pair. As an illustrative example, the first $\lambda 5$ emitter can be polarized vertically and the second $\lambda 5$ emitter can be polarized horizontally, or vice versa. Other orthogonal combinations could also be employed. This pump source arrangement can provide increased power at each wavelength. Alternatively, a single emitter can comprise a pump source for each wavelength, without the need for pump pairs.

The output of a pump source 414 can be propagated through a wavelength stabilizer 411, which can include a fiber Bragg grating reflector that provides a small feedback (about 1% to 3%) in a narrow linewidth (e.g., 1 nm-2 nm) to force (or lock) pump source operation at a desired longitudinal mode. The wavelength stabilizer 411 is used to more efficiently generate output at a desired wavelength. Alternatively, a wavelength stabilizer may be integral with an individual source. In a further alternative, a bandpass filter can be employed, but with an additional loss.

In addition, pump assembly sub-group 400 can include one or more polarization beam combiners (PBC) (in FIG. 13, five PBC) 412. The PBC are used in this example to polarization couple the orthogonally polarized pairs of pump sources into a single combined beam for each wavelength. In addition, one or more pump wavelength combiners (PWC) 413 can be utilized to combine the multiple wavelength beams into a single multiplexed beam at 419. The number of beam combiners can be greater or less than the specific example shown in FIG. 13.

In addition, according to the present invention, the pump assembly sub-group 400 can further include one or more optical isolators 417. As is described in greater detail in the Experiment Section below, the inventors have discovered that when backward pumping (for Raman amplification) a transmission span, especially a multi-segment span that includes a fiber type having an appreciable Rayleigh backscatter coefficient, such as an IDF type fiber (IDF, 2xIDF, 3xIDF, etc., used for dispersion compensation), the Rayleigh scatter from the span can propagate back towards the pump, from well within the span. This effect can be even more pronounced when providing Raman amplification for a broadband optical data signal (e.g. from 50 nm-150 nm bandwidth, or greater). This Rayleigh backscatter is thus amplified by the high gain segment of the span. For example, as described below, a three segment span can include a low non-linearity type fiber (segment I), a dispersion compensating fiber (such as an IDF for segment II), and a high gain fiber (segment III). Thus, large backscatter emanating from within the span, which can be greater in segment II, is amplified by segment III. As discovered by the inventors, this Raman amplification of the Rayleigh scatter at lower wavelengths is also transferred to higher wavelengths due to stimulated Raman scattering.

Amplified Rayleigh backscatter, especially at the higher pump wavelengths, is then fed back into the pump sources. This amplified Rayleigh backscatter feedback can thus compete with the feedback already generated by the wavelength stabilizer. The result of this additional feedback, even at a level of about ¼%, is the generation of power fluctuations of the pump output or locking to a different longitudinal mode or modes. Example power fluctuations are described in detail below. Thus, the inventors have determined that selectively isolating one or more of the pump wavelengths within a pump assembly/sub-group can greatly reduce or eliminate pump power fluctuations caused by Rayleigh backscatter. The inventors have further determined that optical isolators are not necessary at all pump source locations, but can be strategically implemented, thus providing an efficient way to reduce or eliminate deleterious feedback, without incurring the greater expense in terms of cost, reliability, and real estate of placing optical isolators at all pump locations. This selective placement of optical isolators is especially advantageous whether implementing many pump sources within a single Raman pump, e.g., for a single transmission span, or several pump sources coupled together in a pump assembly utilized to simultaneously pump many transmission spans for Raman amplification.

In the example configuration of FIG. 13, $\lambda 5$ can correspond to the longest wavelength pump source (e.g., at $\lambda 5$=1500 nm-1510 nm). As is shown, only a single optical isolator 417 is used in this pump assembly sub-group. For this configuration, isolator 417 can be a conventional optical isolator, designed for the $\lambda 5$ wavelength, that is located after the PBC coupler 412 of the $\lambda 5$ pump pair. However, in other contemplated configurations, a second and/or a third optical isolator can be additionally placed, for example, after the PBC of the $\lambda 4$ and $\lambda 3$ pump pairs. As the amplified Rayleigh backscatter can cause greater feedback at the longer wavelengths, additional or fewer isolators can be incorporated in pump assembly sub-group 400, depending on the pump wavelength regions utilized, as would be apparent to one of ordinary skill in the art given the present description.

Alternatively, optical isolator 417 can be placed at a different location within pump assembly sub-group 400, such as at location 415, which is after the pump wavelength combiner 413 of the $\lambda 5$, $\lambda 4$, and $\lambda 3$ pumps. This location will require that the optical isolator has a higher power tolerance, as the pump power at such a location can be about 1 Watt or greater. In addition, depending on the wavelength difference of the $\lambda 5$, $\lambda 4$, and $\lambda 3$ pumps, the optical isolator may need to be designed to cover a greater wavelength range.

In a further alternative, an integrated PBC/isolator 427, (i.e. a single device that performs polarization beam coupling and optical isolation) shown to the side of pump assembly sub-group 400 in FIG. 13, can be utilized, e.g., in place of separate beam combiner 413 and isolator 417 for the $\lambda 5$ (or other) pump pair. Of course, integrated PBC/isolator 427 can also be used in other locations in pump assembly sub-group 400, depending on the feedback reduction needed. The ability to selectively place one or a few optical isolators within a pump assembly sub-group has an additional benefit in cost/equipment savings, especially when utilizing multiple pump assembly sub-groups within a single pump assembly.

FIG. 6 is a schematic of an optical communication system using Raman amplifiers that is contemplated to be used in conjunction with the present invention. This optical communications system is further described in U.S. Pat. No. 6,618,195, issued Sep. 9, 2003, which is incorporated by reference herein in its entirety. As would be apparent to one of ordinary skill in the art given the present description, variations of the optical communication system using Raman amplifiers shown in FIG. 6 can also be utilized in conjunction with the present invention.

In FIG. 6, amplifiers 40 include a pump assembly with a P×P or P×V coupler that allows coupling to multiple fiber transmission paths, as will be described in more detail below. A P×P coupler is a coupler with P inputs and P outputs. A P×V coupler is a coupler with P inputs and V outputs. The optical system of FIG. 6 includes a transmitter terminal 10 and a receiver terminal 12. The transmitter terminal includes a number of optical communication transmitters 14*a*, 14*b*, ... 14*z* respectively transmitting signals at optical communications wavelengths $\lambda a$, $\lambda b$, ... $\lambda z$. (It should be noted that the letter z does not imply that $\lambda z$ is the twenty-sixth wavelength, i.e., z may be smaller or larger than twenty-six).

The optical signals are multiplexed by a multiplexer 16 and are amplified by a series of amplifiers 40. The signals are transmitted from the transmitter 10 to the amplifiers, between the amplifiers, and from the amplifiers to the receiver 12 via one or more transmission optical fibers 26. For distributed Raman amplification, the optical amplifier will also include transmission optical fiber. The optical signals are then demultiplexed by demultiplexer 18 of receiver 12 to respective optical communications receivers 20*a*, 20*b*, ... 20*z*. The demultiplexer 18 sends optical communications wavelengths $\lambda a$, $\lambda b$, ... $\lambda z$ to respective optical communications receivers 20*a*, 20*b*, ... 20*z*.

Although FIG. 6 shows signals directed from transmitter terminal 10 to receiver terminal 12 for ease of illustration, in general the transmitter terminal 10 and receiver terminal 12 are typically transmitter/receiver terminals for bidirectional communication. In this case each of the transmitter/receiver terminals will have transmitters as well as receivers and both a multiplexer and demultiplexer.

Figure 7:
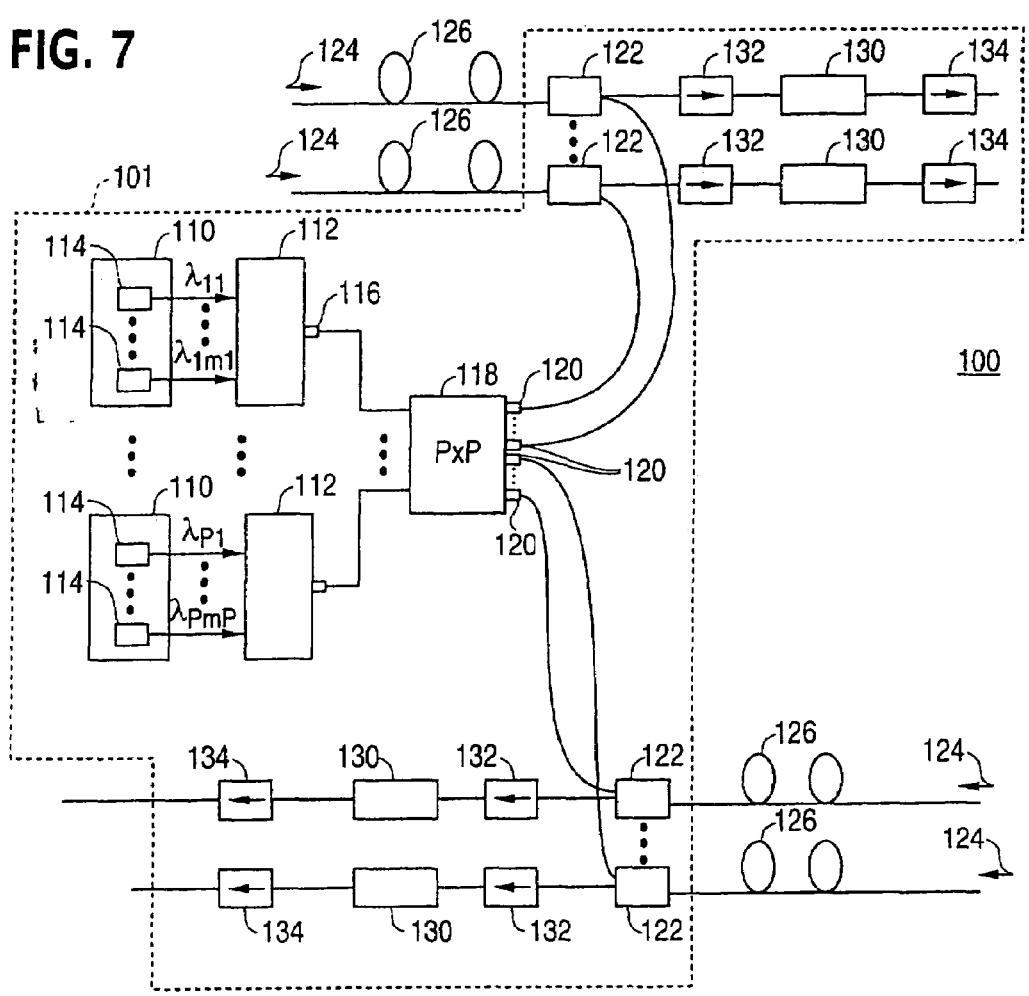
FIG. 7 is a schematic of an amplifier including a pump assembly containing a P×P coupler that can utilize the device and method of the present invention.

An amplifier 40 that can be used in conjunction with the present invention is now described. FIG. 7 illustrates one example an optical amplifier 100 that may be used as the amplifier 40 in the system of FIG. 6. The amplifier 100 includes optical pump assembly 101 (shown enclosed by dashed lines) and transmission fiber 126. The pump assembly 101 allows for coupling to, and amplification of, up to P fiber transmission paths, as described below.

Pump assembly 101 further includes a pump assembly sub-group 400, which is designed to reduce amplified Rayleigh backscatter-based feedback, as is described with respect to FIG. 13. In the example of FIG. 7, the pump assembly 101 includes a number N of pump radiation sources 110 optically coupled to respective pump radiation combiners 112. In this embodiment the number of pump radiation combiners 112 is also N. N in this embodiment is any integer greater than one. Alternatively, the number of combiners and pump radiation sources 110 may not be the same number.

Each of the pump radiation sources 110 produces radiation having a set of wavelengths $\lambda_{i1}$ to $\lambda_{imi}$, where i designates the ith pump radiation source, and mi is the number of wavelengths generated by the ith pump radiation source. For example, the first pump radiation source generates a set of wavelengths $\lambda_{11}$ to $\lambda_{1m1}$ (m1 is the number of wavelengths generated by the first pump radiation source), while the Nth pump radiation source generates a set of wavelengths $\lambda_{N1}$ to $\lambda_{NmN}$ (mN is the number of wavelengths generated by the Nth pump radiation source). In general, the radiation corresponding to each wavelength $\lambda$ will not be only the wavelength $\lambda$, but a range of wavelengths with $\lambda$ as the peak wavelength. This is so because a radiation source providing the wavelength $\lambda$ will not provide an infinitely narrow range of wavelengths. Thus, it is understood that radiation generated at a wavelength $\lambda$ will include a finite bandwidth of wavelengths around $\lambda$.

The pump radiation sources 110 may each comprise one or more individual radiation emitters 114. These individual radiation emitters 114 may be lasers or light emitting diodes, for example. The lasers may be fiber lasers, fiber coupled microchip lasers, or semiconductor lasers, for example.

Each of the pump radiation sources 110 produces radiation having a set of pump wavelengths and pump powers corresponding to the pump wavelengths. The pump wavelengths and pump powers of each set are generally different from those of another set. Thus, in general, it is possible to have a large number of different pump wavelengths and/or pump powers produced by the pump assembly 101. As defined herein, one set of wavelengths is said to be different from another set of wavelengths if the sets of wavelengths are not identical. For example, a first set of four wavelengths $\lambda_{11}$ through $\lambda_{14}$ is different from a second set of four wavelengths, $\lambda 21$ through $\lambda_{24}$, if $\lambda_{11}$ through $\lambda_{13}$ are identical to $\lambda_{21}$ through $\lambda_{23}$, respectively, but $\lambda_{14}$ is different from $\lambda_{24}$. Of course, all of the wavelengths of a set may be different from the corresponding wavelengths of all the other sets, i.e, the sets of wavelengths may be entirely different.

The individual radiation emitters 114 of a particular pump radiation source 110 emit radiation at the respective wavelengths of the set of wavelengths of that particular pump radiation source. These individual radiation emitters may have integral wavelength stabilizers as part of the emitter. For example, for the ith pump radiation source providing radiation at wavelengths $\lambda_{i1}$ to $\lambda_{imi}$, the individual radiation emitters 114 of the ith pump radiation source 110 respectively emit radiation at wavelengths $\lambda_{i1}$ to $\lambda_{imi}$.

Alternatively, any or all of the pump radiation sources 110 may comprise a single radiation emitter that simultaneously emits radiation at the wavelengths of the set of wavelengths of the pump radiation emitter. For example, the ith pump radiation source may comprise a single radiation source that simultaneously emits radiation at wavelengths $\lambda_{i1}$ to $\lambda_{imi}$. In this regard the pump radiation source may be a lamp.

Each pump radiation combiner 112 couples or combines the radiation at the wavelengths of the set of wavelengths of a respective pump radiation source 110. For example, the ith pump radiation combiner 112 couples the radiation from the ith pump radiation source 110. However, a combiner may couple the radiation of a plurality of sources 110, or a plurality of combiners 112 may couple radiation from a single source 110. The combiner 112 may be, for example, a WDM multiplexer.

In this aspect, an optical isolator, such as optical isolator 417 from FIG. 13, can be selectively placed after the output of one or more pump radiation sources 110. Alternatively, one or more optical isolators can be selectively placed after the output(s) of one or more individual radiation emitters within a single pump source 110.

The coupled radiation provided by a combiner 112 is output at a pump radiation combiner output 116 of the combiner. There are N pump radiation combiner outputs 116, one for each of the N pump radiation combiners 112. The coupled radiation at each output 116 will have its own coupled radiation profile, which will be a combination of the radiation profiles of the radiation input into the combiner 112.

The N pump radiation combiner outputs 116 are optically coupled to a P×P coupler 118. The coupler 118 may be, for example, a fused fiber coupler or a waveguide coupler. The number P may be a power of 2, i.e., $P=2^Q$, where Q is a positive integer. For example, P may be two or four or eight. Alternatively, the number P may be a positive integer greater than 1, where P is not a power of 2. N may be equal to, less than, or greater than P. Preferably N is equal to P. However, N need not be equal to P and may be less than P, for example, so that not all of the inputs of the P×P coupler are used.

The P×P coupler 118 receives the coupled radiation from the N combiners 112 via the pump radiation combiner outputs 116. The P×P coupler 118 outputs pump signals via P coupler outputs 120. Each of the pump signals has a respective pump radiation profile. Because the P×P coupler 118 combines the coupled radiation profiles input into the P×P coupler, the output from each of the P coupler outputs 120 has the spectral shape of the combined coupled radiation profiles. Thus, the spectral shape of each of the output P pump radiation profiles is the same, and that spectral shape is the combination of the coupled radiation profiles. Therefore, each of the P pump radiation profiles has a contribution from all of the individual wavelengths of the N pump radiation sources 110.

Of course the power of the individual pump radiation profiles will be less than the power of the combination of the coupled radiation profiles, because the P×P coupler 118 splits the total input power among the P coupler outputs 120. Nevertheless, the spectral shape of each of the P pump radiation profiles is the same, and that spectral shape is the shape of the combination of the coupled radiation profiles.

In many applications it will be desirable to have the same power for each of the P pump radiation profiles. However, in some applications, it may be desired to have a different power for at least some of the P pump radiation profiles output by the coupler 118. The optical amplifier may couple to and amplify up to P optical fiber transmission paths. This is accomplished as described below.

Respective pump radiation profiles are output from respective P×P coupler outputs 120 to respective of P pump-signal combiners 122. Each of the pump-signal combiners 122 optically couples an optical signal with a respective pump radiation profile output by the coupler 118. Specifically, an optical signal 124 propagates along a respective optical fiber 126 to a respective pump-signal combiner 122, where it is combined with a respective pump radiation profile. Preferably, there are P fibers 126, carrying respective optical signals 124, optically connected to the pump assembly 101 of this embodiment. However, there may be less than P fibers 126. The pump radiation counter-propagates with respect to a respective optical signal 124 and amplifies the signal 124 in the fiber 126. The optical fiber 126 may be a transmission fiber of the optical communication system of FIG. 6, for example. However, if desired, the amplification may occur in a special Raman fiber, i.e., the amplifier 100 may be a discrete Raman amplifier.

According to one aspect of the present invention, optical fiber(s) 126 can be a transmission span(s) having the same or similar construction to the transmission spans described in U.S. Pat. No. 6,633,712, issued Oct. 14, 2003 (incorporated by reference above).

In particular, fiber/transmission span 126 can include a plurality of segments. In the embodiment shown in FIG. 12, transmission span 126 includes a first segment 1110, which comprises fiber 1113, a second segment 1120, which comprises fiber 1123, and a third segment 1130, which comprises fiber 1133, where these segments are also referred to herein as segment I, segment II, and segment III. In this embodiment, the fiber of each segment can have one or more different physical characteristics from the fiber(s) of at least one other segment within the same span. These physical characteristics can include dispersion properties, dispersion slope properties, fiber composition (including core and cladding compositions), effective mode field area, Raman gain coefficient, and nonlinearity (e.g. Kerr coefficients). The fibers can be attached to one another (e.g., segment I can be attached to segment II) with conventional fusion splicing techniques and the like. Alternatively, a single drawn fiber can be utilized, where the differing physical characteristics defining each different segment are inherent in the particular fiber used. For example, a fiber having sections of different effective mode field areas (such as through the use of tapered cores) can be utilized.

However, the present invention is not limited to a particular number of segments within a span. The present invention can be utilized with spans having one, two, three, four, five, six, or more segments.

Figure 12:
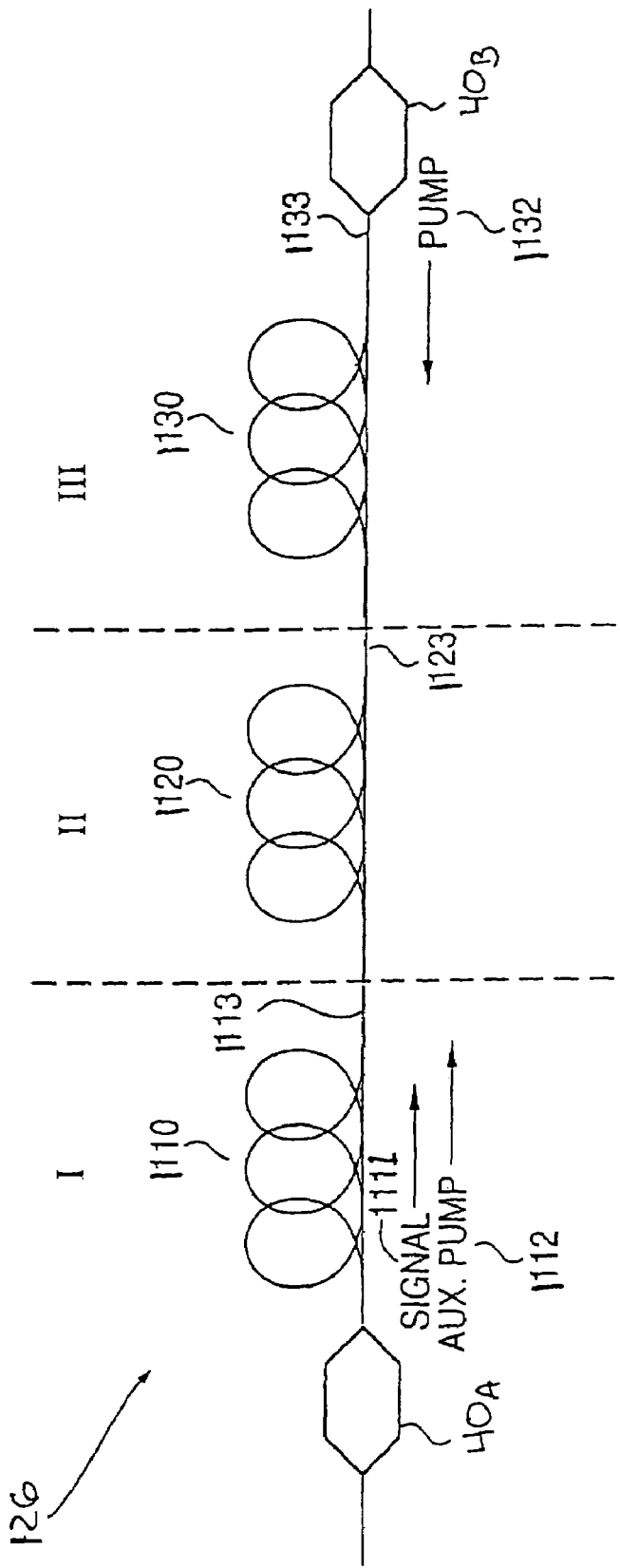
FIG. 12 is an example three-segment dispersion map for a long-haul transmission system.

According to an aspect of the invention shown in FIG. 12, segment I (1110) is designed to mitigate non-linear effects, segment II (1120) is designed to compensate for dispersion, and segment III (1130) is designed to compensate for transmission loss by providing a gain medium for amplification of the optical signal 1111. Of course, the arrangement of these segments can be altered, as would be apparent to one of ordinary skill in the art given the present description. In addition fewer or more segments can be provided to further compensate for other transmission impairments.

For purposes of this description, the optical signal 1111 can be a conventional multiplexed (e.g., WDM, DWDM, and the like), modulated (e.g., 2.5 Gb/s, 10 Gb/s, and higher) data signal that is transmitted along a link that includes the span 126 from a transmitter (see FIG. 6) to a receiver (see FIG. 6). The optical (data) signal 1111 can have a high aggregate data rate (e.g., >2 Tb/s). In the embodiments described herein, the optical signal 1111 can be transmitted in the preferred mid-IR telecommunications wavelength region (1400 nm-1650 nm). However, the method and system of the present invention are not limited to this communications band. Alternative wavelength regions (e.g., at about 1300 nm) can be utilized, as would be apparent to those of ordinary skill in the art, given the present description.

According to another aspect, segment I (1110) is designed to provide low nonlinearity. By "low nonlinearity" for the transmission span, it is meant that the accumulated nonlinearity over the span is small compared to that for a conventional span (e.g., a span comprising a conventional NZD fiber type) of comparable length and of equivalent noise figure based on discrete amplification. In this respect, an optical fiber 1113 having a large effective mode field area ($A_{eff}$) can be selected, where $A_{eff}$ represents the size of the mode supported by the core of the fiber. Preferably, an $A_{eff}$ approximate in size to the total area of the core can be selected. For example, the $A_{eff}$ for this segment can be from about 70 μm² to about 120 μm² can be utilized.

In addition, segment I can be selected to provide low signal attenuation. For example, a low loss silica core fiber (see e.g., Table I set forth below, which shows a number of conventional fibers for segment I) can be utilized. In addition, the Rayleigh backscatter coefficient (RBC) for a segment I type fiber can be relatively low. For example, a typical SMF type fiber can have an RBC of about −43 dB/km. Other types of fiber can also be utilized, as would be apparent to one of ordinary skill in the art given the present description. Preferably, the optical data signal power averaged over distance in segment I is large as compared to that in the other segments.

According to another aspect, segment II (1120) is designed to compensate for the dispersion characteristics of the span. In particular, the overall dispersion in span 126 can be compensated by providing one or more particular segments, here segment II (1120), to compensate for the dispersion characteristics of segment I, and preferably segments I and III (1110 and 1130), such that dispersion of span 126 is near zero, per the dispersion condition described in detail below.

According to another aspect of the present invention, the net dispersion of the span 126 should be relatively very small. Due primarily to four wave mixing (4WM), it is preferable that the magnitude of the local dispersion (i.e., the dispersion value at any point in the fiber) be substantially non-zero. If the total link dispersion is non-zero, cross phase modulation (XPM) impairments and any cross-talk between the WDM channels via, e.g., Raman gain, can be minimized.

For segment II, an optical fiber having a smaller effective mode field area ($A_{eff}$) can be selected. Preferably, a smaller effective mode field area fiber can be placed in the lower-optical power portion of the span so that nonlinear impairments resulting from the small effective area will be minimized, but also the smaller core will impart Raman gain to the signals more efficiently. Preferably, segment II includes a fiber having an $A_{eff}$ of from about 15 μm² to about 40 μm² can be utilized. In addition, the segment II fiber can be a conventional Ge-doped silica fiber or an inverse dispersion fiber (IDF) type. The Rayleigh backscatter coefficient (RBC) for a segment II type fiber can be relatively high (as compared to segments I and III). For example, a 2xIDF type fiber can have an RBC of about −36 dB/km. The higher RBC for this example segment II fiber may also be due, at least in part, to the smaller $A_{eff}$ of this fiber. Other types of fiber can also be utilized, (see e.g., Table I described below, which shows a number of fibers for segment II), as would be apparent to one of ordinary skill in the art given the present description.

According to a preferred embodiment of the system shown in FIG. 12, segment III (1130) is designed to provide some gain for the optical signal 1111 and also transport pump power to segment II, where the small core diameter provides for higher Raman gain. For segment III, a fiber can be selected that has a relatively larger $A_{eff}$ as compared to segment II, and a comparable or smaller $A_{eff}$ as compared to segment I. For example, the segment III fiber 133 can have an $A_{eff}$ of from about 45 μm² to about 70 μm². An exemplary fiber composition for segment III can be a silica-clad, Ge-doped silica core fiber. The RBC for a segment III type fiber can be relatively low, i.e., similar to that for segment I. Other types of fiber can also be utilized, (see e.g., Table I described below, which shows a number of conventional fibers for segment III), as would be apparent to one of ordinary skill in the art given the present description.

According to this embodiment, the amplification can be based on a distributed amplification scheme, such as DRA, a distributed amplification scheme using an erbium doped fiber, or a hybrid amplification scheme that includes both distributed Raman amplification and distributed erbium amplification.

Distributed Raman amplification (DRA) can be utilized to provide gain in order to compensate for transmission loss along the span. As described herein, distributed Raman amplification can be provided by injecting IR radiation (e.g., pump signal 1132) from multiple pump lasers into segment III, counter-propagating to the optical (data) signal(s) 1111. For example, as described above, a pump assembly 101 located in amplifier 40B can be utilized to provide pumping for Raman amplification. Injection of the pump 1132 can be a counter-propagating pump into fiber 1133. A forward pump originating at amplifier 40A can be utilized to provide auxiliary pumping to span 126.

Several different example segment selections for span 100, based on the features of the invention, will be described below for illustrative purposes.

TABLE I

| Fiber Type | Segment Loction | Effective Area (1550 nm), $A_{eff}$ (μm²) | Dispersion (1550 nm), D (ps/nm/km) | Dispersion Slope (1550 nm), D' (ps/nm²/km) | Zero-dispersion wavelength, $\lambda_0$ (nm) | Attenuation (1550 nm), $\alpha_{1550}$ (dB/km) | Attenuation (1385 nm), $\alpha_{1385}$ (dB/km) |
|---|---|---|---|---|---|---|---|
| Corning SMF-28 (SMF) | I | 85 | 17 | 0.060 | 1310 | 0.20-0.25 | <2.0 |
| Lucent Matched Clad (SMF) | I | 85 | 17 | 0.060 | 1310 | 0.20-0.25 | <1.0 |
| Lucent AllWave (SMF) | I | 85 | 17 | 0.60-0.65 | 1310 | 0.19-0.23 | <0.32 |
| SCF (silica core fiber, typical values)* | I | 80 | ~14 | — | — | 0.173 | — |
| NDSF (non-dispersion shifted fiber)** | I | 107 | 20.2 | 0.062 | <1300 est. | 0.192 | — |
| Lucent True Wave-RS | III | 55 | 3.0-5.3 | <0.050 (0.045 typ.) | 1450-1510 | 0.20-0.21 | <1.0 |
| Lucent True Wave-SRS | III | 50 | (−4.8)-(−1.4) | <0.050 | 1580-1635 | <0.215 | — |
| Lucent TrueWave-XL | III | 72 | (−4.6)-(−1.4) | <0.112 | 1565-1590 | 0.20-0.21 | <1.0 |
| Corning LEAF | III | 72 | 4.0 | <0.114 | 1510-1520 | <0.25 | <1.0 |
| Corning SMF-LS | III | 55 | 2.0-5.0 | <0.08 | 1510-1530 | 0.20-0.25 | — |
| Corning MetroCor | III | 50 | (−7.5) | 0.12 | 1610-1620 | <0.25 | <0.4 |
| IDF × 1 (inverse dispersion fiber)*** | II | 36 | (−20.8) | −0.067 | — | 0.235 | — |
| IDF × 2 (double inverse disp. fiber)** | II | 31 | (−40.8) | (−0.124) | — | 0.251 | — |
| IDF × 3 (triple inverse disp. Fiber)*** | II | 26 | (−54.2) | (−0.168) | — | 0.292 | — |
| DCF (disp. Compensating fiber)*** | II | 19 | (−95) | (−0.32) | — | 0.50 | — |

In Table I, the values correspond to those found in P. B. Hansen, et al., "Unrepeatered WDM transmission experiment with 8 channels of 10 Gb/s over 352 km", *IEEE Photon. Techn. Lett.*, vol. 8, pp. 1082-1084 (1996); S. N. Knudsen, et al., "New dispersion-slope managed fiber pairs for undersea fiber optic transmission systems", presented at Sub-Optic Conference, 2000; and in S. N. Knudsen, M. O. Pedersen and L. Grüner-Nielsen, "Optimisation of dispersion compensating fibres for cabled long-haul applications", *Electron. Lett.*, vol. 36 (2000).

Based on the above commercially available and published fiber characteristics, and on the features of described in the U.S. Pat. No. 6,633,712 patent (incorporated above), exemplary transmission spans can be more optimally designed.

Returning to FIG. 7, the pump assembly 101 couples pump radiation profiles to up to P different optical fiber transmission paths. Thus, the pump assembly 101 allows for amplification of optical signals along P optical paths. In addition, as described above, pump assembly 101 can reduce or eliminate amplified Rayleigh backscatter-based feedback from a conventional transmission span or a multi-segment dispersion mapped transmission span such as described above. As the single pump assembly 101 may amplify signals for P separate paths, the pump assembly 101 allows both for redundancy and for a flatter gain profile overall, if desired, while still requiring less pump wavelength sources, such as lasers, per optical path than in a conventional system. This redundancy advantage is due in large part to the addition of the P×P coupler (or P×V coupler later described) to the pump assembly which allows up to P fibers (or V fibers) to share the pump wavelengths of the pump assembly.

The amplifier 100 can provide a flatter gain profile, or some other desired gain profile, over a desired first wavelength range with fewer lasers per optical path amplified because the radiation provided by the lasers is shared by the optical paths. The flatness is largely determined by the total number of pump wavelengths provided by the pump assembly because all the wavelengths together will determine the spectral shape of the pump signal provided to the transmission fibers. In general, the total number of different wavelengths can be as large as the total number of radiation emitters (or larger if radiation emitters that provide more than one wavelength are used).

On the other hand, the number of pump radiation emitters per amplified optical path is the total number of pump radiation emitters divided by P (or V for a P×V coupler). Therefore the total number of pump wavelengths provided by the pump assembly may remain large while the number of pump radiation emitters, such as lasers, per optical path is reduced. Thus, the cost of amplification per optical path can be reduced.

Further, because the total number of pump wavelengths for a single amplifier can be large, the amplification system can provide redundancy. This is so because with a large number of wavelengths, each of the wavelengths may have another wavelength relatively close by. Thus, the failure of a single pump wavelength emitter or source will not significantly alter the shape of the gain profile. Furthermore, it is anticipated that the pump assembly of the present invention may be designed so that if one pump wavelength emitter or source fails, the power of another pump wavelength emitter or source emitting at the same or an adjacent wavelength is increased. In this case the failure of a single pump wavelength emitter will have even less effect on the shape of the gain profile.

For many applications, such as applications involving wave division multiplexing (WDM) over a broad range of wavelengths, it will be desired to have a substantially flat gain profile over the broad range of wavelengths, for example, with a gain ripple less than 0.5 dB peak-to-peak. For example, it may be desired to have a substantially flat gain profile over a first range of wavelengths with a particular range width. Preferably the range width is between 20 and 120 nm. For example, the wavelength range may be 1500 to 1620 nm with a range width of 120 nm. However, the present invention is not limited to an amplification gain profile that is substantially flat, and the amplification gain profile can have any shape desired.

If a substantially flat gain profile is desired, the individual coupled radiation profiles from the respective pump radiation combiners 112 should provide gain profiles that are complementary to each other. In other words the superposition of the gain profiles due to individual radiation profiles will provide a substantially flat gain profile. It should be noted that the superposition of the gain profiles is not generally a linear superposition because of pump-pump interactions.

The pump assembly 101 may optionally include P gain flattening elements 130 to further improve the flatness of the gain profile. The gain flattening element may be a fiber Bragg grating, for example. The gain flattening elements 130 are positioned between respective optional first isolators 132 and second isolators 134. The first and second isolators 132 and 134 act to allow electromagnetic radiation to pass only in the direction that the signal 124 propagates. After the signal 124 passes through the second isolator, the signal 124 propagates along a transmission optical fiber (not shown).

Figure 8:
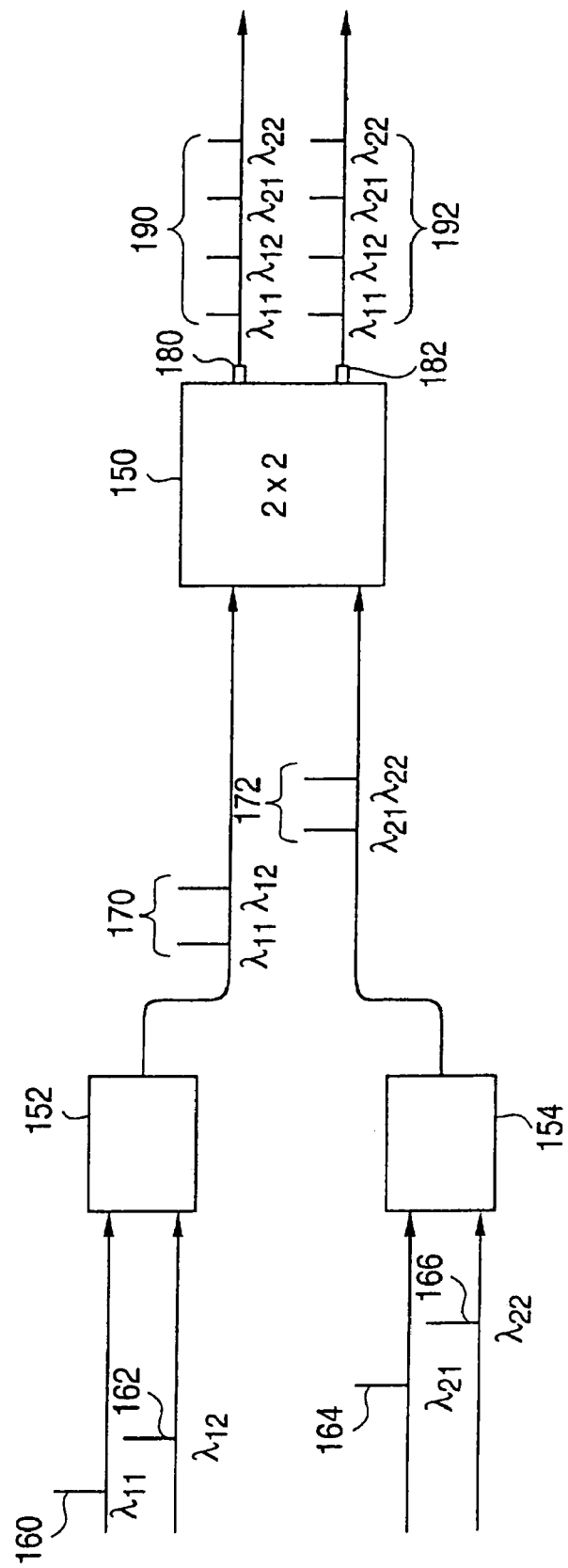
FIG. 8 is a schematic that illustrates coupled radiation profiles and the pump radiation profiles.

FIG. 8 is a schematic that illustrates example coupled radiation profiles and the pump radiation profiles. The example of FIG. 8 includes a 2×2 coupler 150. Two pumps 160 and 162, having respective wavelengths $\lambda 11$ and $\lambda 12$, are input into a first pump radiation combiner 152 and two other pumps 164 and 166, having respective wavelengths $\lambda 21$ and $\lambda 22$, are input into a second pump radiation combiner 154. Thus, there are two pump radiation sources, each connected to a respective combiner 152 and 154. Each source contains two emitters, such as two lasers. In FIG. 8, the power of a particular wavelength is indicated by the height of the line at the wavelength. The magnitude of the power of each of the four pumps is the same in the example of FIG. 8, and the wavelengths are chosen to increase from $\lambda 11$ to $\lambda 12$ to $\lambda 21$ to $\lambda 22$, for ease of illustration. Of course, the powers and peak wavelength arrangement may be different as desired.

The first pump wavelength combiner 152 couples the pumps 160 and 162 to produce a first coupled radiation profile 170, and the second pump radiation combiner 154 couples the pumps 164 and 166 to produce a second coupled radiation profile 172. The first coupled radiation profile 170 is simply the linear combination of the profiles of the pumps 160 and 162, while the second coupled radiation profile 172 is simply the linear combination of the profiles of the pumps 164 and 166. For ease of illustration in this example, we assume that there is no power loss at the combiners 152 and 154. Of course in practice there will be a power loss at the combiners so that the total power output from a combiner will be less than the power input into the combiner.

As can be seen in FIG. 8, the first coupled radiation profile 170 has a power at $\lambda 11$ equal to the power of pump 160 and a power at $\lambda 12$ equal to the power of pump 162. Similarly, the second coupled radiation profile 172 has a power at $\lambda 21$ equal to the power of pump 164 and a power at $\lambda 22$ equal to the power of pump 166.

The first and second coupled radiation profiles 170 and 172 are then input into 2×2 coupler 150. The 2×2 coupler 150 has outputs, 180 and 182, which output respective pump radiation profiles 190 and 192. In the example of FIG. 8 the pump radiation profiles 190 and 192 are identical and have the profile of a combination of the coupled radiation profiles 170 and 172. The combination of the coupled radiation profiles 170 and 172 is the linear superposition of the profiles 170 and 172. For ease of illustration in this example, it is assumed that there is no power loss at the 2×2 coupler 150. Of course in practice there will be a power loss at the coupler 150 so that the total power output from the coupler 150 will be less than the power input into the coupler 150.

Because the power of the combination of the coupled radiation profiles 170, 172 is split between the two outputs 180 and 182, each of the pump radiation profiles 190 and 192 has one-half the power of the combination of the coupled radiation profiles 170 and 172. Thus, the power at each of the wavelengths $\lambda 11$ through $\lambda 22$ for either of the pump radiation profiles 190, 192 will be one-half of the power of the pump input at that wavelength into one of the radiation combiners 152 or 154. Of course in general for a P×P coupler at a given wavelength the output power is 1/P times the input power at the given wavelength. For a P×V coupler (described later) output power is 1/V times the input power at the given wavelength.

Also, as can be seen, the pump radiation profiles 190 and 192 include contributions from all of the wavelengths λ11 through λ22.

Figure 9:
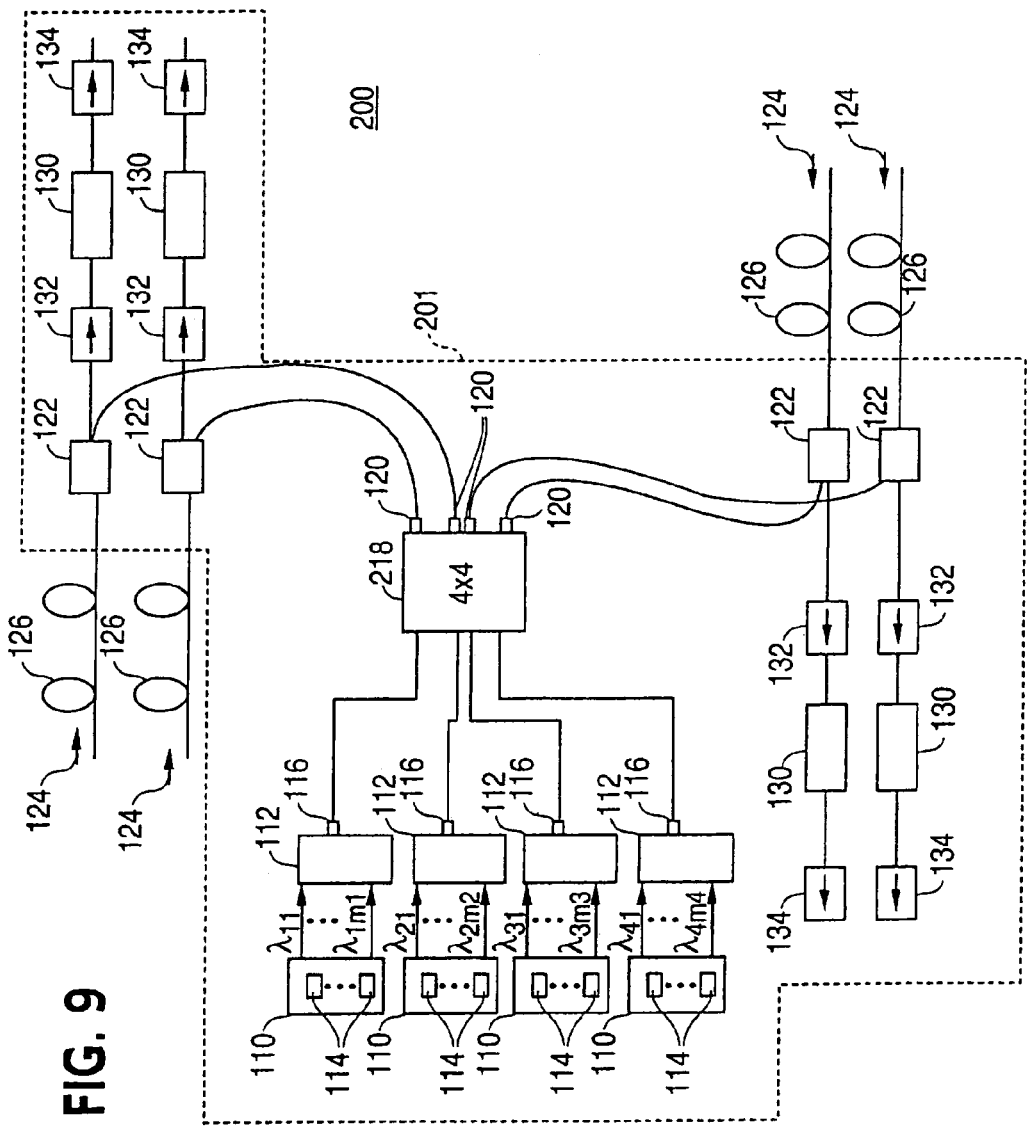
FIG. 9 is a schematic of an amplifier including a pump assembly containing a 4×4 coupler that can utilize the device and method of the present invention.

FIG. 9 is a schematic of another aspect where the amplifier contains a 4×4 coupler. Thus, this amplifier may amplify up to four transmission fiber paths 126. The embodiment of FIG. 9 is similar to that of FIG. 7 except that the specific value of P is four. Thus, the description of like features with like reference numerals may be omitted for the sake of brevity. The optical amplifier 200 in FIG. 9 includes optical pump assembly 201 (shown enclosed by dashed lines) and transmission fiber 126. The optical pump assembly 201 includes four pump radiation sources 110 optically coupled to respective pump radiation combiners 112. In this embodiment the number of pump radiation combiners 112 is also four. The optical amplifier 200 may be used as the amplifier 40 in the system of FIG. 6. In addition, according to an aspect of the present invention, each pump assembly sub-group can include one or more selectively placed optical isolators to reduce or eliminate amplified Rayleigh backscatter-based feedback from fibers 126 in accordance with the principles described previously.

Returning to FIG. 9, each of the pump radiation sources 110 produces radiation having a set of wavelengths $\lambda_{i1}$ to $\lambda_{imi}$, where i designates the ith pump radiation source, and mi is the number of wavelengths generated by the ith pump radiation source.

The first through fourth pump radiation sources 110 produce radiation having first through fourth sets, respectively, of pump wavelengths and pump powers corresponding to the pump wavelengths. Each set of pump wavelengths may be different from each other set of pump wavelengths. Alternatively, some of the sets of pump wavelengths may be different from each other, while other sets are identical.

Each of the four pump radiation combiners 112 couples or combines the radiation at the wavelengths of the set of wavelengths of its respective pump radiation source 110. For example, the fourth pump radiation combiner 112 couples the radiation from the fourth pump radiation source 110.

The coupled radiation provided by a combiner 112 is output at a pump radiation combiner output 116. There are four pump radiation combiner outputs 116, one for each of the four pump radiation combiners 112. The coupled radiation at each output 116 will have its own coupled radiation profile, which will be a combination of the radiation profiles of the radiation input into the combiner 112.

The four pump radiation combiner outputs 116 are optically coupled to a 4×4 coupler 218. The 4×4 coupler 218 receives the coupled radiation from the four combiners 112 via the pump radiation combiner outputs 116. The 4×4 coupler 218 outputs a set of pump signals via the four coupler outputs 120. Each of the pump signals has a respective pump radiation profile. Because the 4×4 coupler 218 combines the coupled radiation profiles input into the 4×4 coupler, the output from each of the four coupler outputs 120 has the spectral shape of the combined coupled radiation profiles. Thus, the spectral shape of each of the four pump radiation profiles is the same, and that spectral shape is the shape of the combination of the four coupled radiation profiles. Therefore, each of the four pump radiation profiles has a contribution from all of the individual wavelengths of four pump radiation sources.

Of course the power of the individual pump radiation profiles output by the coupler 218 will be less than the power of the combination of the coupled radiation profiles, because the 4×4 coupler 218 splits the total input power among the four coupler outputs 120. In this case each of the four coupler outputs will have one-fourth the total power (excluding power loss at the combiner).

The pump assembly 201 couples to up to four fibers 126, as described below. Respective pump radiation profiles are output from respective 4×4 coupler outputs 120 to respective of the four pump-signal combiners 122. Each of the pump-signal combiners 122 optically couples an optical signal with a respective pump radiation profile output by the coupler 218. Specifically, an optical signal 124 propagates along a respective fiber 126 to a respective pump-signal combiner 122, where it is combined with a respective pump radiation profile. There are four fibers 126, carrying respective optical signals 124, optically connected to the pump assembly 201 of this embodiment. The pump radiation profile radiation counter-propagates with respect to a respective optical signal 124 and amplifies the signal 124 in the fiber 126. The pump assembly 201 may optionally include gain flattening elements 130 and isolators 132 and 134 in a similar fashion to the embodiment of FIG. 7.

Figure 10A:
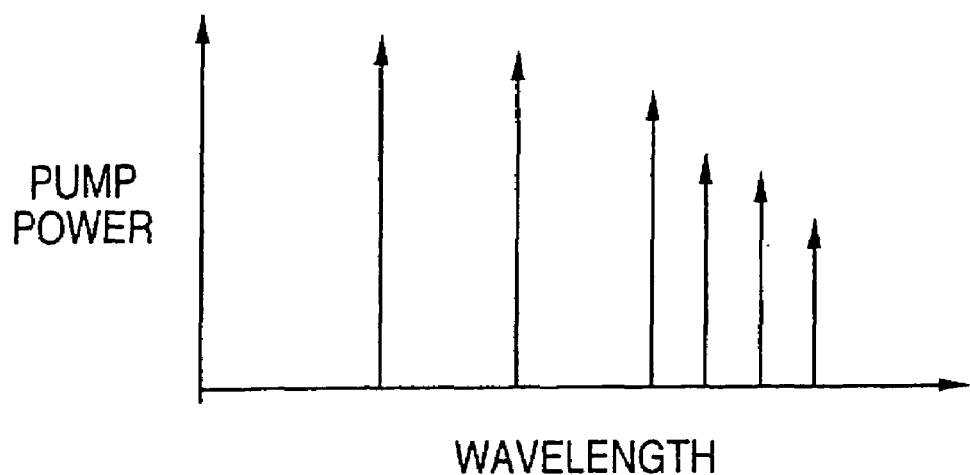
FIGS. 10A and 10B respectively illustrate an exemplary pump power-pump wavelength scheme for an amplifier containing a 2×2 coupler.
Figure 10B:
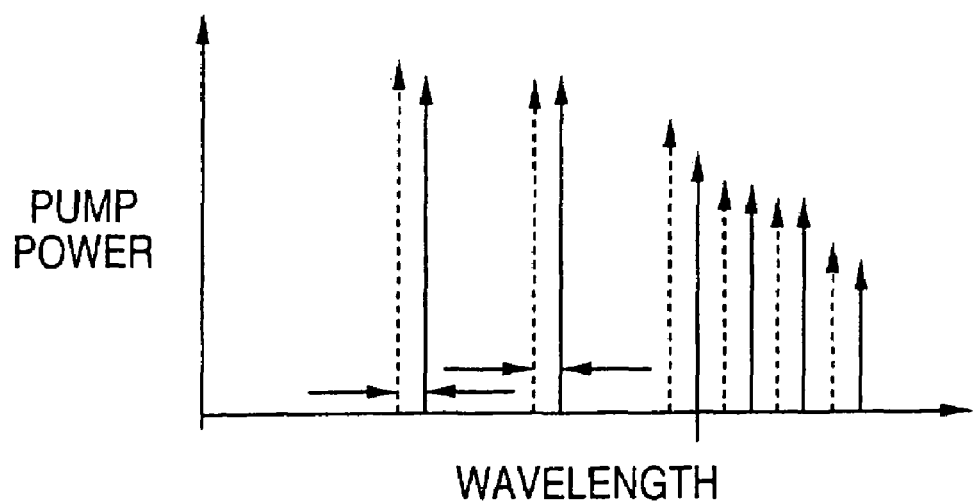

An example of a pump wavelength-pump power scheme for an amplifier according to an embodiment of the present invention with a 2×2 coupler is shown in FIGS. 10A and 10B. Specifically, FIG. 10A illustrates a coupled radiation profile of a first set of pump wavelengths output from a first pump radiation combiner, while FIG. 10B illustrates a coupled radiation profile of a second set of pump wavelengths output from a second pump radiation combiner. The exemplary pump wavelength-pump power scheme for both of the first and second sets includes six wavelengths each. In FIG. 10B the pump powers of the second set of pump wavelengths is shown by the solid lines. FIG. 10B also shows the pump powers of the first set of pump wavelengths by dashed lines. The relatively small difference in wavelength between corresponding wavelengths of the first and second sets provides for improved redundancy. In this regard corresponding wavelengths of the first and second sets of wavelengths are "adjacent" to one another. Adjacent wavelengths are wavelengths that are separated by 20 nm or less, and can include wavelengths that are separated by 10 nm or less. If the power for one of the wavelengths of one of the sets fails, there remains a corresponding wavelength in the other set. Thus, the failure of one wavelength does not drastically affect the overall pump wavelength-pump power gain profile.

It is not necessary that all of the wavelengths have an adjacent wavelength or another wavelengths that is the same to provide at least some redundancy. While all of the wavelengths may have an adjacent wavelength or another wavelengths that is the same, it may also be desired that only most or just some of the wavelengths have an adjacent wavelength or another wavelength that is the same.

In some applications redundancy may not be required or desired. In this case, none of the wavelengths may have an adjacent wavelength or another wavelength that is the same.

In general, once a pump wavelength scheme is chosen for an amplifier, the pump powers of the pump wavelengths can be set. The pump wavelengths are set so that the optical gain profile of the amplifier is the desired gain profile, such as a substantially flat gain profile.

The number of pump wavelengths for each of the first and second sets need not be the same. For example, one of the first and second sets may have five pump wavelengths, while the other of the first and second sets may have seven pump wavelengths. Further the total number of pump wavelengths in the first and second sets need not add up to twelve in order to produce a substantially flat gain profile. For example, one of the first and second sets may have seven wavelengths and the other of the first and second sets may have six wavelengths. Increasing the number of pump wavelengths has the advantage of increasing the flatness of the gain profile for a given wavelength range.

The flatness of a gain profile may be defined in terms of the gain ripple of the gain profile. If a flat gain profile is desired, the gain ripple of the overall combined pump radiation gain profile should be less than the gain ripple of the coupled radiation profiles of individual sets of wavelengths. Thus, the pump wavelength-pump power scheme of the preferred embodiments of the present invention may be such that the gain ripple of the gain profile of the overall combined pump radiation gain profile will typically be less than the gain ripple of the coupled radiation profiles of individual sets of wavelengths.

The total number of pump wavelengths provided by the pump assembly will depend upon the specific application and factors such as the gain profile flatness and redundancy desired and the wavelength range of the optical signals to be amplified. Although FIGS. 10A and 10B illustrate a total of twelve wavelengths, the total number of wavelengths may be eighteen, twenty, twenty-four, or even more.

In addition, according to an aspect of the present invention, the determination of pump sources which are susceptible to amplified Rayleigh backscatter, and correspondingly, the selection of the number of optical isolators and placement of those isolators within a pump assembly, can be accomplished in conjunction with the above embodiment. As described herein, the selection of pump sources and the placement of optical isolators within a pump assembly, can depend on factors such as the type of transmission span(s) to be utilized, the Rayleigh backscatter coefficient of the transmission span(s), the pump scheme, the bandwidth to be amplified, the pump output wavelength of particular sources, and the transmission span gain. Based on the pumping scheme, one or more sets of adjacent wavelengths may be selected for isolation. Alternatively, not every wavelength of a particular set of adjacent wavelengths need be isolated, as is apparent from the description herein.

Figure 11:
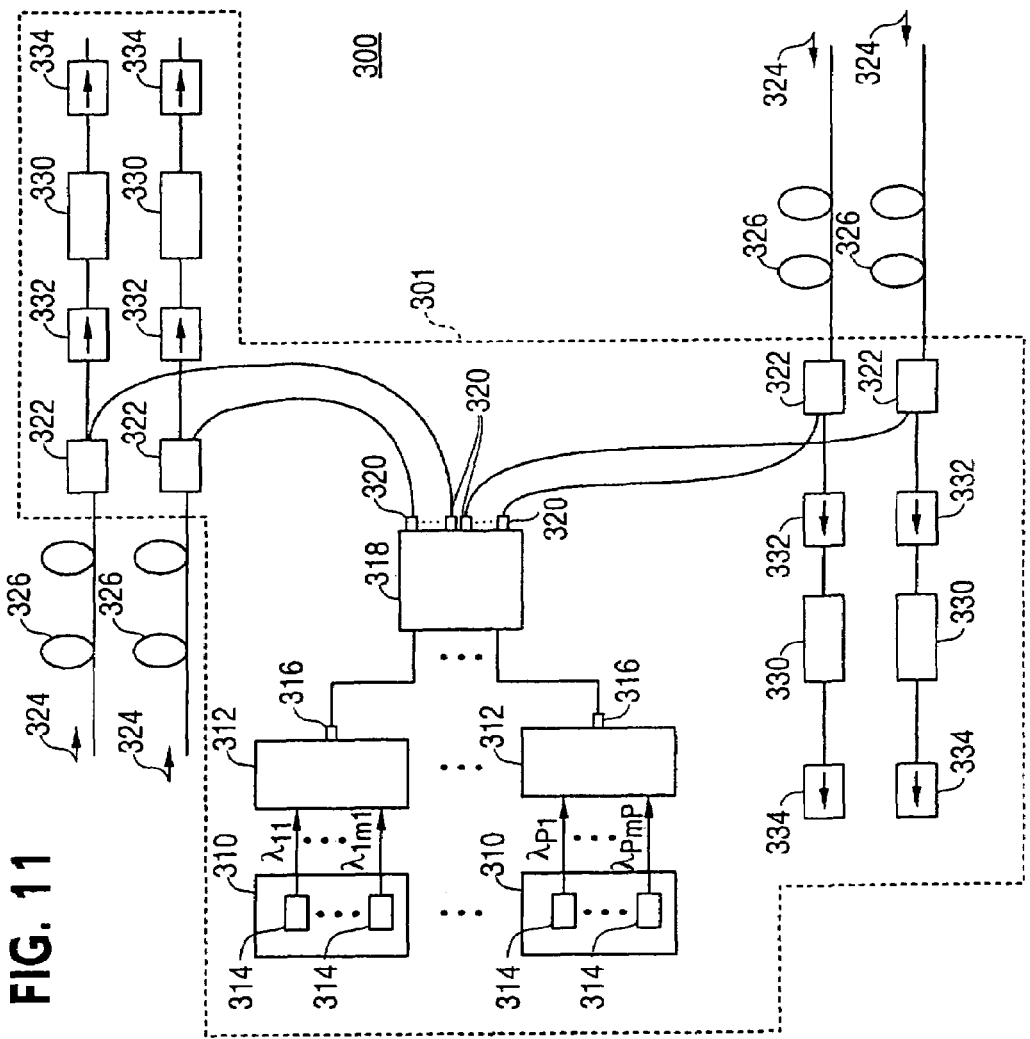
FIG. 11 is a schematic of an amplifier including a pump assembly containing a coupler that can utilize the device and method of the present invention.

FIG. 11 is a schematic of an optical amplifier 300 according to another embodiment of the invention. The amplifier 300 includes optical pump assembly 301 (shown enclosed by dashed lines) and transmission fiber 326. This embodiment differs from the embodiment of FIG. 7 in that the pump assembly 301 does not include a P×P coupler. Instead the pump assembly 301 includes a P×V coupler 318. A P×V coupler has P inputs and V outputs. Thus, this pump assembly can couple to and amplify up to V fiber transmission paths. The pump assembly 301 includes a number P of pump radiation sources 310 optically coupled to respective pump radiation combiners 312. In this embodiment the number of pump radiation combiners is also P. The optical amplifier 300 may be used as the amplifier 40 in the system of FIG. 6. In addition, one or more pump assemblies, such as those that include a pump assembly sub-group such as shown in FIG. 13, can be utilized.

Returning to FIG. 11, each of the pump radiation sources 310 produces radiation having a set of wavelengths $\lambda_{i1}$ to $\lambda_{imi}$, where i designates the ith pump radiation source, and mi is the number of wavelengths generated by the ith pump radiation source. For example, the first pump radiation source generates a set of wavelengths $\lambda_{11}$ to $\lambda_{1m1}$, while the Pth pump radiation source generates a set of wavelengths $\lambda_{P1}$ to $\lambda_{PmP}$.

The pump radiation sources 310 may each comprise a number of individual radiation sources 314. These individual radiation sources 314 may be lasers or light emitting diodes, for example. The lasers may be fiber lasers, fiber coupled microchip lasers, or semiconductor lasers, for example.

Each of the pump radiation sources 310 produces radiation having a set of pump wavelengths and pump powers corresponding to the pump wavelengths. The sets of pump wavelengths and pump powers are generally different from one another.

The individual radiation sources 314 of a particular pump radiation source 310 emit radiation at the respective wavelengths of the set of wavelengths of that particular pump radiation source. For example, for the ith pump radiation source providing radiation at wavelengths $\lambda_{i1}$ to $\lambda_{imi}$, the individual radiation sources 314 of the ith pump radiation source respectively emit radiation at wavelengths $\lambda_{i1}$ to $\lambda_{imi}$.

Alternatively, any or all of the pump radiation sources 310 may comprise a single radiation source that simultaneously emits radiation at the wavelengths of the set of wavelengths of the pump radiation source. For example, the ith pump radiation source may comprise a single radiation source that simultaneously emits radiation at wavelengths $\lambda_{i1}$ to $\lambda_{imi}$. In this regard, a pump radiation source may be a lamp.

Each pump radiation combiner 312 couples or combines the radiation at the wavelengths of the set of wavelengths for a respective pump radiation source 310. For example, the ith pump radiation combiner couples the radiation from the ith pump radiation source.

The coupled radiation provided by a combiner 312 is output at a pump radiation combiner output 316 of the combiner. There are P pump radiation combiner outputs 316, one for each of the P pump radiation combiners 312. The coupled radiation at each output 316 will have its own coupled radiation profile, which will be a combination of the radiation profiles of the radiation input into the combiner 312.

The P pump radiation combiner outputs 316 are optically coupled to a P×V coupler 318 with P inputs and V outputs. The number P is a positive integer greater than 1. V may be greater than, equal to, or less than P. The coupler 318 receives the coupled radiation from the P combiners 312 via the pump radiation combiner outputs 316. The coupler 318 outputs pump signals via V coupler outputs 320. Each of the pump signals has a respective pump radiation profile. Because the coupler 318 combines the coupled radiation profiles input into the coupler 318, the output from each of the V coupler outputs 320 has the spectral shape of the combined coupled radiation profiles. Thus, the spectral shape of each of the V pump radiation profiles is the same, and that spectral shape is the shape of the combination of the P coupled radiation profiles. Therefore, each of the V pump radiation profiles has a contribution from all of the individual wavelengths of the P pump radiation sources.

Of course the power of the individual pump radiation profiles will be less than the power of the combination of the coupled radiation profiles, because the coupler 318 splits the total power among the V coupler outputs 320.

In many application it will be desirable to have the same power for each of the V pump radiation profiles. However, in some applications, it may be desired to have a different power for at least some of the V pump radiation profiles.

Respective pump radiation profiles are output from respective coupler outputs 320 to respective of V pump-signal combiners 322. Each of the pump-signal combiners 322 optically couples an optical signal with a respective pump radiation profile. Specifically, an optical signal 324 propagates along a respective fiber 326 to a respective pump-signal combiner 322 where it is combined with a respective pump radiation profile. There are V optical signals 324 and V fibers 326 optically connected to the pump assembly 301 of this embodiment. The pump radiation profile radiation counter-propagates with respect to a respective optical signal 324 and amplifies the signal 324 in the fiber 326.

Figure 14:
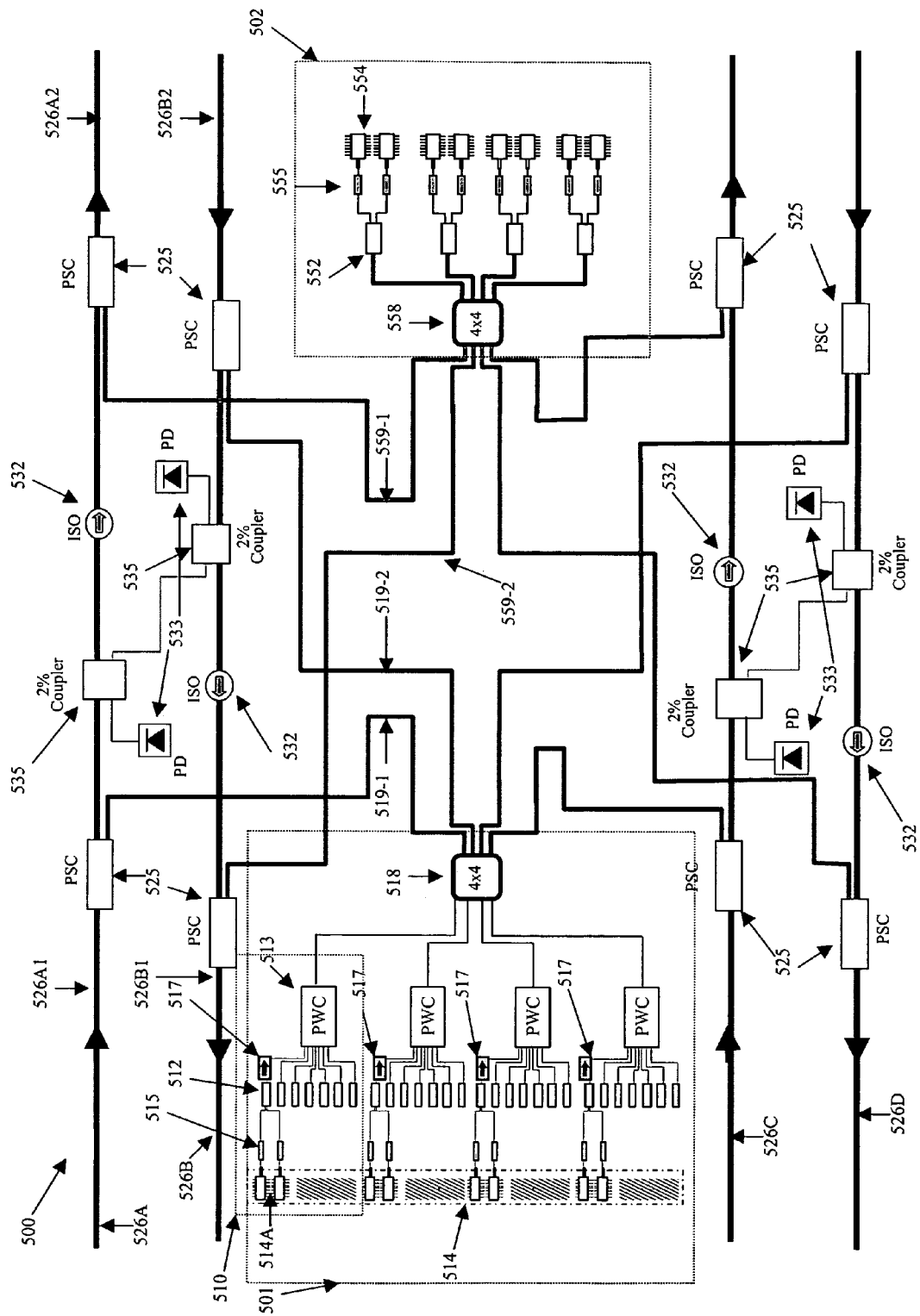
FIG. 14 is an example line quad architecture according to an embodiment of the present invention.

FIG. 14 shows another embodiment, a pump arrangement for forward and backward pumping multiple transmission spans that can incorporate a pump assembly configured to reduce or eliminate amplified Rayleigh backscatter. System 500 is a pumping station that can be part of a line unit or system amplifier unit that provides for amplification of 4 separate transmission spans 526A-526D, and is referred to as a "line-quad architecture." The embodiment of FIG. 14 is shown for illustrative purposes only, and is not meant as a limitation to the particular type of line-quad architecture that may be utilized.

System 500 includes a pump assembly 501 for backward pumping transmission spans 526A-526D and a pump assembly 502 for forward pumping those spans. Within pump assembly 501, four sets of pump assembly sub-groups 510 (only the first pump assembly sub-group is depicted as enclosed in a dashed line box in FIG. 14) are utilized to provide for Raman amplification in spans 526A-526D. In spans 526A and 526C, the data transmission signal propagates in a first direction. In spans 526B and 526D, the data transmission signal propagates in a second (opposite) direction.

Similar to that described above for FIG. 13, pump assembly sub-group 510 includes a set of pump sources 514, such as the sources described previously, with outputs appropriate for Raman amplification to provide broadband signal gain. In this illustration, pump pair 514A can comprise two orthogonally polarized radiation emitters that have an output wavelength(s) at the longer wavelength region(s) of the particular pumping scheme utilized. In addition, each pump source can be coupled with a wavelength stabilizer 515 (separate or integral, similar to that described above) to lock the particular pump to a desired longitudinal mode. Pump assembly sub-group 510 can further include a set of polarization beam combiners (PBC) 512 that operate as described above in FIG. 13.

As is shown in FIG. 14, pump assembly sub-group 510 can further include one or more optical isolators 517. In the depicted embodiment, a single isolator 517 is utilized in each pump assembly sub-group for the longest output wavelength of each pump source set. Second and third isolators (not shown) can also be utilized in each pump assembly sub group to isolate additional sources/pump wavelengths of interest. Alternatively, as the output from all the pump assembly sub-groups is eventually coupled together by a 4×4 coupler, only a single pump source or pump pair may need to be isolated, depending on factors such as the bandwidth of the signal, the wavelength(s) of the selected pump source(s) to be isolated, an estimated return loss for the optical transmission span(s), the length of the optical transmission span(s), the gain of the optical transmission span(s), and a Rayleigh backscatter coefficient of the optical transmission span(s). Alternatively, optical isolator 517 can be placed at a different location within pump assembly sub-group 510 and/or the isolator can be part of an integrated PBC/isolator, similar to that described previously.

Pump assembly 501 can further include a pump wavelength combiner (PWC) 513 to combine the outputs of all of the pump sources into a single combined beam. Of course, PWC 513 is not required to be a single device, but may include a set of combiners.

As shown in FIG. 14, the outputs of each pump assembly sub-group are directed to a 4×4 coupler 518, which may be, for example, a fused fiber coupler or a waveguide coupler.

The 4×4 coupler 518 receives the coupled radiation from the combiners 513 and outputs pump signals having the coupled radiation profiles input into the 4×4 coupler, so that the each of the four outputs has the spectral shape of the combined coupled radiation profiles, similar to that described above in FIG. 7.

Four sets of pumps are then distributed from 4×4 coupler 518 into transmission spans 526A-526D. For example, a first combined pump signal propagates from coupler 518 along coupling fiber 519-1 and is coupled into transmission span 526 A1 in a counter-propagating direction and a second combined pump signal propagates from coupler 518 along coupling fiber 519-2 and is coupled into transmission span 526 B2 in a counter-propagating direction. In this embodiment, conventional pump signal combiners (PSC) 525 can be used to couple the backward (counter-propagating) Raman pump signals into the transmission spans.

As shown in FIG. 14, system 500 further includes a pump assembly 502 for providing a forward (co-propagating) pump signal to provide auxiliary gain for the transmission spans 526A-526D. A forward pump signal can be utilized to provide additional (auxiliary) gain and to provide a flatter gain profile, as is described in further detail in the U.S. Pat. No. 6,633,712 patent, incorporated by reference previously.

In the example configuration shown in FIG. 14, pump assembly 502 includes a plurality of pump sources 554, with output wavelengths selected to provide auxiliary gain in the transmission spans 526A-526D. In this example, the number of pump sources 554 is less than the number of pump sources 514. Alternatively, the number of forward pump sources can be the same or higher than the number of backwards pump sources. Also, the wavelength(s) of forward pump source(s) can be the same or different than that of the backwards pump sources.

After passing through (optional) filters 555 and (optional) PBC 552, the pump outputs are coupled at 4×4 coupler 558. Four sets of auxiliary pumps are then distributed from 4×4 coupler 558 into transmission spans 526A-526D. For example, a first combined auxiliary pump signal propagates from coupler 558 along coupling fiber 559-1 and is coupled into transmission span 526 A2 in a co-propagating direction and a second combined auxiliary pump signal propagates from coupler 558 along coupling fiber 559-2 and is coupled into transmission span 526 B1 in a co-propagating direction. In this embodiment, conventional PSC 525 can be used to couple the backward (co-propagating) auxiliary pump signals into the transmission spans.

In this example, each of transmission spans 526A-526D can comprise a multi-segment dispersion mapped fiber, such as one or more of the segmented fiber types described previously. In addition, as the system 500 can be incorporated into a line unit for a fiber network, the system 500 can further include isolators 532 to ensure the correct direction of data signal propagation. A gain shaping/flattening element (not shown, described previously) can also be included. Further, system 500 can further include diagnostic equipment, such as couplers 535 and detectors 533, for maintenance and monitoring capabilities.

Figure 15:
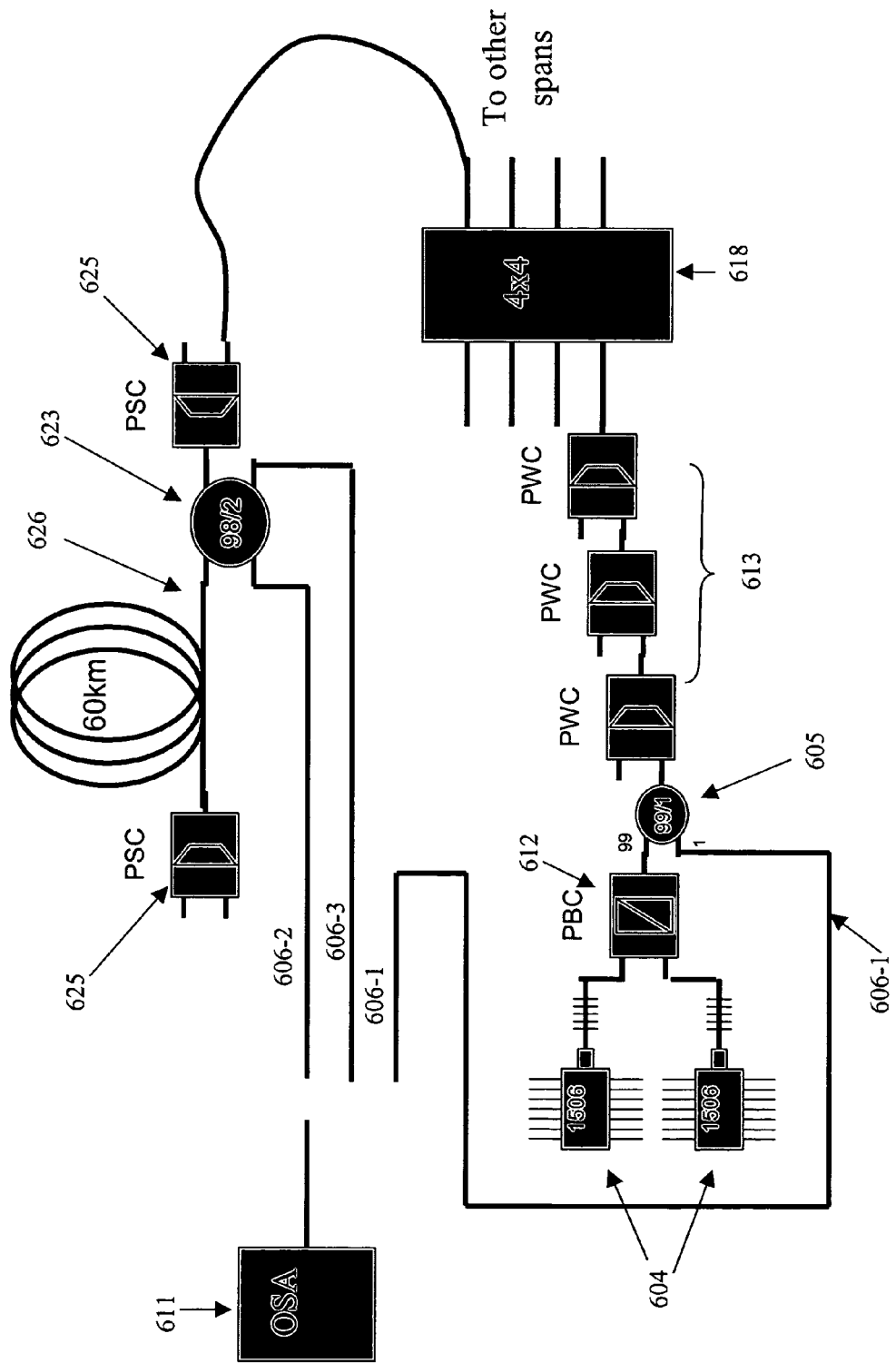
FIG. 15 is a schematic diagram of a return loss measurement experiment.

FIG. 15 shows a schematic diagram of a return loss (RL) measurement experiment that was performed for an example line quad architecture, similar to that shown in FIG. 14. In this experiment, pump sources 604, with outputs at about 1506 nm, polarization coupled at PBC 612, were used as part of a pump scheme to provide a Raman pump for transmission span 626, in a manner similar to that described previously. In this example, transmission span 626 included a three segment map, where segments I and III comprised the same SMF-type fiber, and segment II comprised an IDF-type fiber. The length of the span 626 was about 60 km.

The pump signal was coupled with other wavelengths using PWC 613 and was coupled to span 626 via 4×4 coupler 618. A span pump return loss (RL) was then measured via a four-port 98/2 coupler 623 that tapped off a portion of the signal from span 626. In addition, pump return power (i.e., at the pump source) was estimated/measured using a three-port 99/1 coupler 605 that tapped off a portion of the pump return. A portion of the pump return was directed to optical spectrum analyzer (OSA) 611 via path 606-1. The span RL was directed to OSA 611 via paths 606-2 and 606-3.

Figure 16:
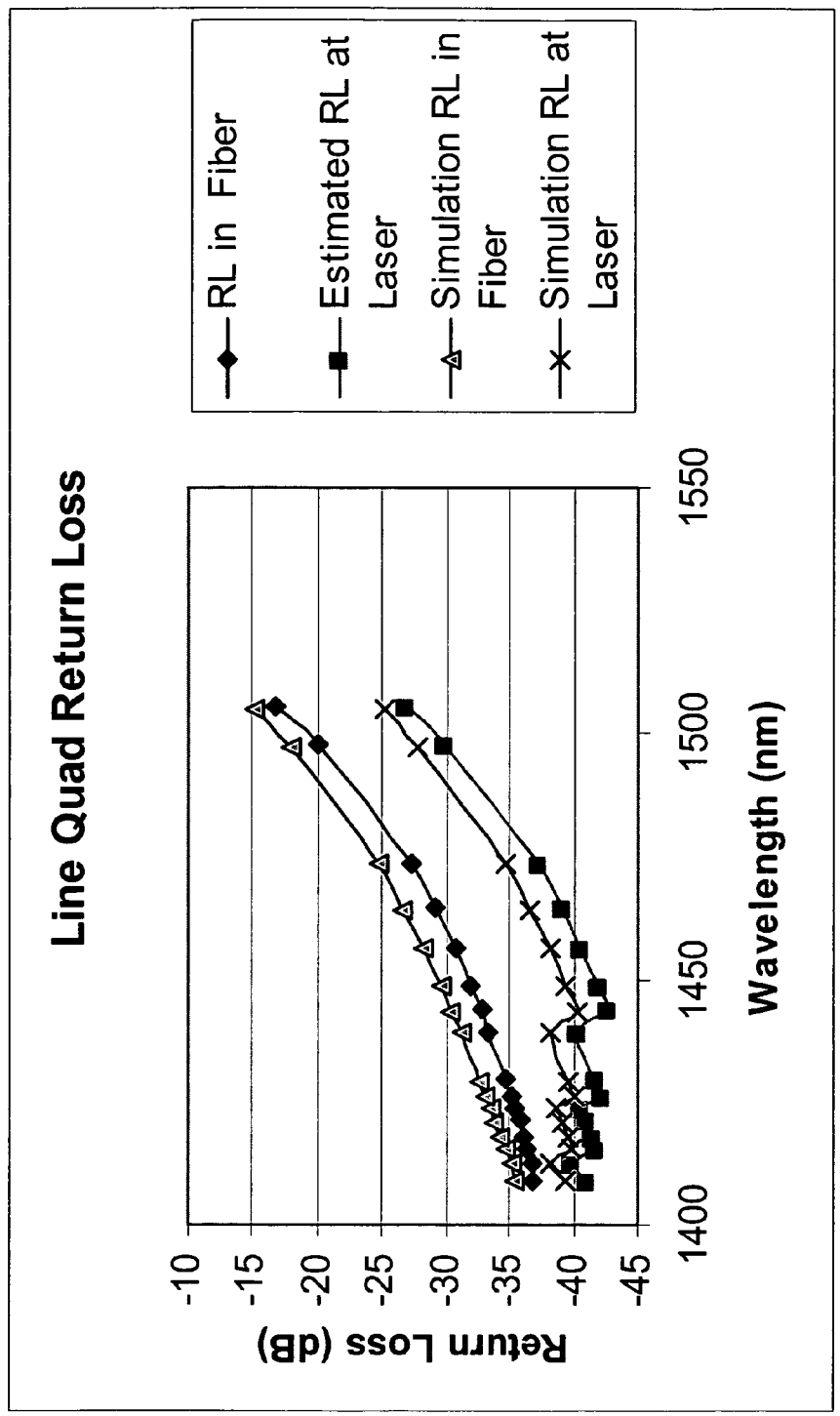
FIG. 16 is a plot of the estimated return loss for a line-quad architecture.

The measured line-quad return loss for this experiment is shown in FIG. 16. The diamond-shaped symbols show that at longer Raman pump wavelengths, the RL in the span increases. This RL was measured using a four-port 2% coupler, such as that described previously. This RL is in good agreement with a simulation (see the triangle-shaped symbols) performed to match actual conditions. The simulation was performed using estimated pump powers. In addition, FIG. 16 shows that the estimated RL at the laser source also increases for longer wavelengths. The estimated pump power in the fiber (from which the loss measurement was determined) was made by measuring the insertion loss. This data shows that amplified Raman backscatter is the likely main contributor. Also, the RL for the pump is in good agreement with the simulation (x-shaped symbols). Assuming a constant Rayleigh coefficient with wavelength, the "return loss" in fiber could be constant at in the range of −37 dB. However, due to the wide range of pump wavelengths and corresponding Raman gain shift, the short Raman pump wavelengths provide significant gain to the longer Raman pump wavelengths. The gain is bi-directional, so the small Rayleigh scattering at the long pump wavelengths is amplified to a significant level, which can have a deleterious effect on the longer pump wavelength stability. Simulations performed using a Raman power transfer code with similar conditions to the experiment confirm the explanation for increased long wavelength return loss.

Thus, in the present invention, the radiation sources providing shorter pump wavelength will generally not need an isolator to reduce the amount of amplified Rayleigh scattering power at the wavelength of the pump radiation source. In fact, the shortest pump wavelength radiation source will not require an isolator in the present invention, because the Rayleigh backscattering at the shortest pump wavelength will not be amplified and will most likely be attenuated as a result of providing Raman gain to the longer pump wavelengths. Whereas, the longer pump wavelength radiation sources will often require isolators to reduce the amount of amplified Rayleigh scattering power at the wavelength of the pump radiation source.

In various embodiments, the pump radiation sources may be associated with an isolator to reduce other types of interference, e.g., non-amplified Rayleigh backscattering interference, such as reflections from optical components, connectors, etc., from feeding back into the radiation source. In these embodiments, the amount of isolation required for the pump sources will vary as a function of pump wavelength with longer wavelength pump sources requiring additional isolation to prevent amplifier Rayleigh backscattering from reach the pump radiation source. The additional isolation can be achieved by providing an isolator for amplified Rayleigh scattering in series with the isolator being used to reduce other interference or by increasing the isolation of the isolators associated with the pump radiation sources that are subject to amplified Rayleigh scattering feedback.

Figure 17:
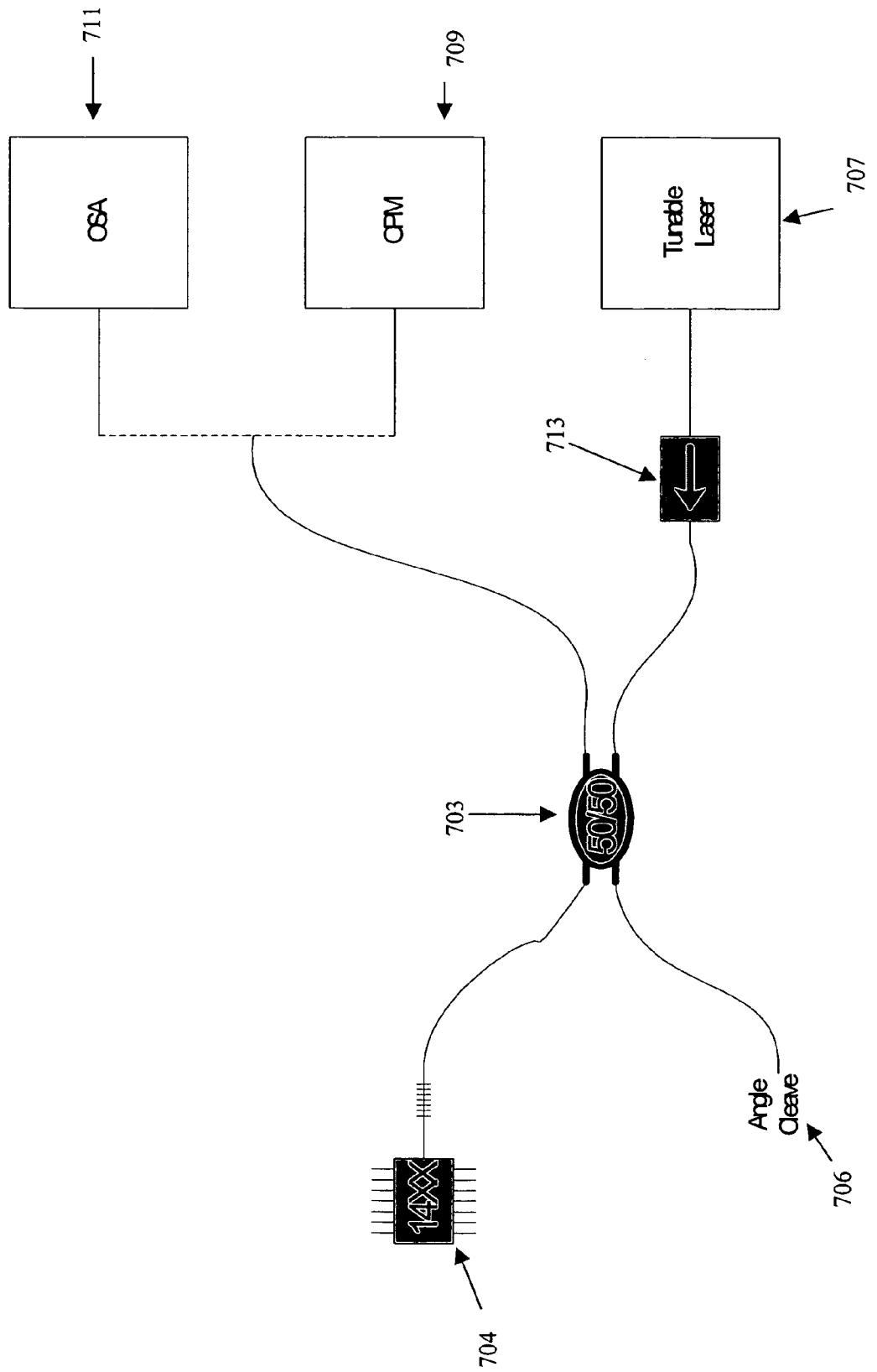
FIG. 17 is a schematic of a pump feedback tolerance experiment.

Because there is a significant portion of pump power that returns to the pump source, the inventors then performed a pump feedback tolerance experiment to determine the deleterious effect of the RL at the pump source. FIG. 17 shows a schematic of a pump feedback tolerance experiment to measure the stability of the pump source (in terms of the change in output power) in the presence of a controllable feedback signal.

In the experiment, an Agere 14xx pump laser source 704, with an output wavelength of about 1506 nm, was directed to a 2×2 50/50 coupler 703. A wavelength stabilizer was also utilized to lock the output of source 704. In addition, a commercially available Agilent tunable laser source 707 (i.e., an external cavity diode laser to provide narrow linewidth, with tunable output in the 1480 nm-1520 nm wavelength region) was also directed to coupler 703. The output from tunable laser 707 was used to simulate how different wavelengths and powers of feedback signals affect the performance of the source 704. In this experiment, the tunable laser 707 was used to simulate feedback power levels of about −65 dB to about −18 dB and feedback wavelengths from about 1500 nm to about 1510 nm. An OSA 711 and an optical power meter (OPM) 709 were used to monitor the wavelength and power performance of source 704. An angle cleave 706 was used to provide termination for the excess signal (to prevent deleterious reflections from the unused coupler port) and an optical isolator 713 was used to prevent the signal from source 704 from affecting the stability/output of tunable laser 707.

Figure 18:
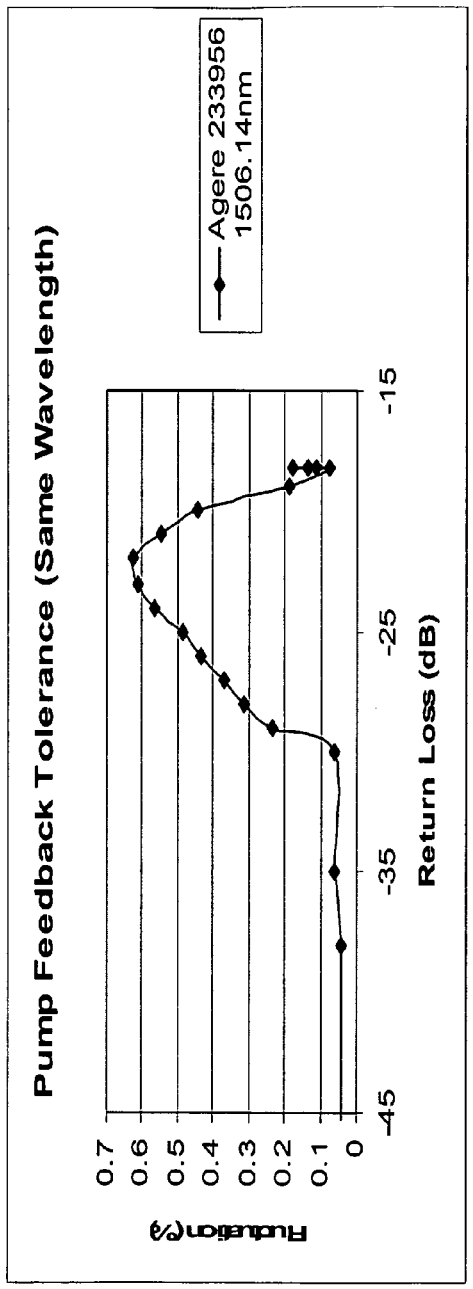
FIG. 18 is a plot of the results of a feedback tolerance experiment.

FIG. 18 shows the results of one set of pump feedback tolerance experiments for a pump source operating at about 1506 nm. The 1506 nm source (diamond-shaped symbols) experienced instability in the presence of in-band feedback. When the RL reaches a level greater than −30 dB (here, peaking at −25 dB), the output power fluctuation of the laser source can reach a fluctuation level greater than 0.60%. Thus, when the source is implemented in a Raman amplifier such as described above, not only will the RL cause power fluctuations that deleteriously affect the gain profile for the transmission span, but also the RL provides additional feedback that can cause the source to lock on a different longitudinal mode, which in turn further affects the Raman gain profile. For a single span of about 60 km, a 0.65% power change at 1506 nm can result in a maximum gain change of about 0.032 dB (~0.73%). Over a full system with over 100 spans, such gain changes at various longer wavelengths at each amplifier can result in significantly larger and rapidly changing gain excursion values.

Figure 19:
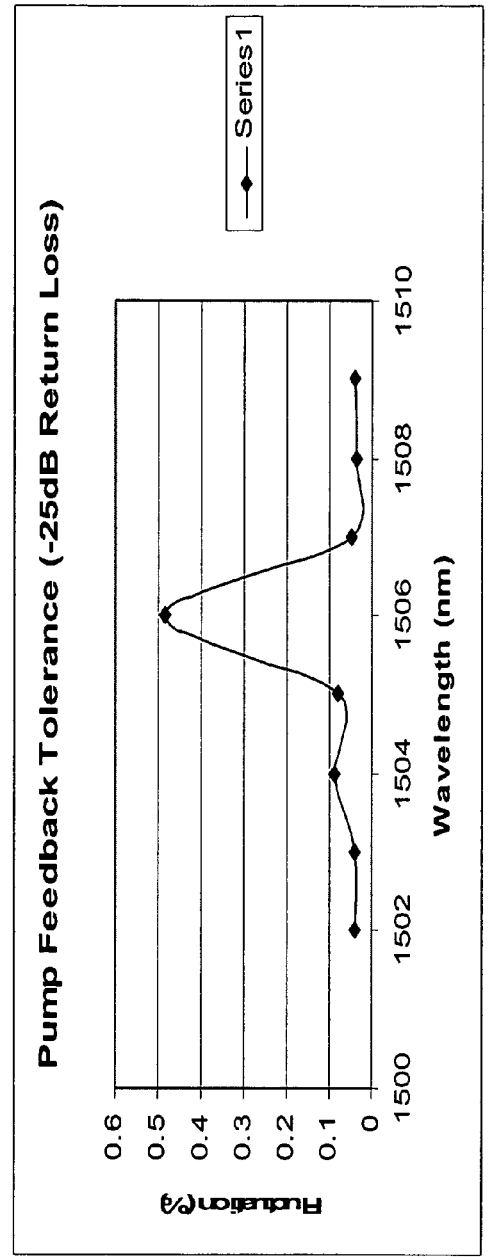
FIG. 19 is a plot of the spectral response of a laser source to feedback.

In addition, a slight shift of mode power distribution was observed with the 1506 nm source, with a continuous shifting back and forth while operating in an unstable condition. Further, as shown in FIG. 19, the spectral response of laser source to feedback is relatively narrow, as there is minimal effect at out-of-band wavelengths, while there is a nearly 0.50% fluctuation at 1506 nm for a −25 dB RL.

Figure 20:
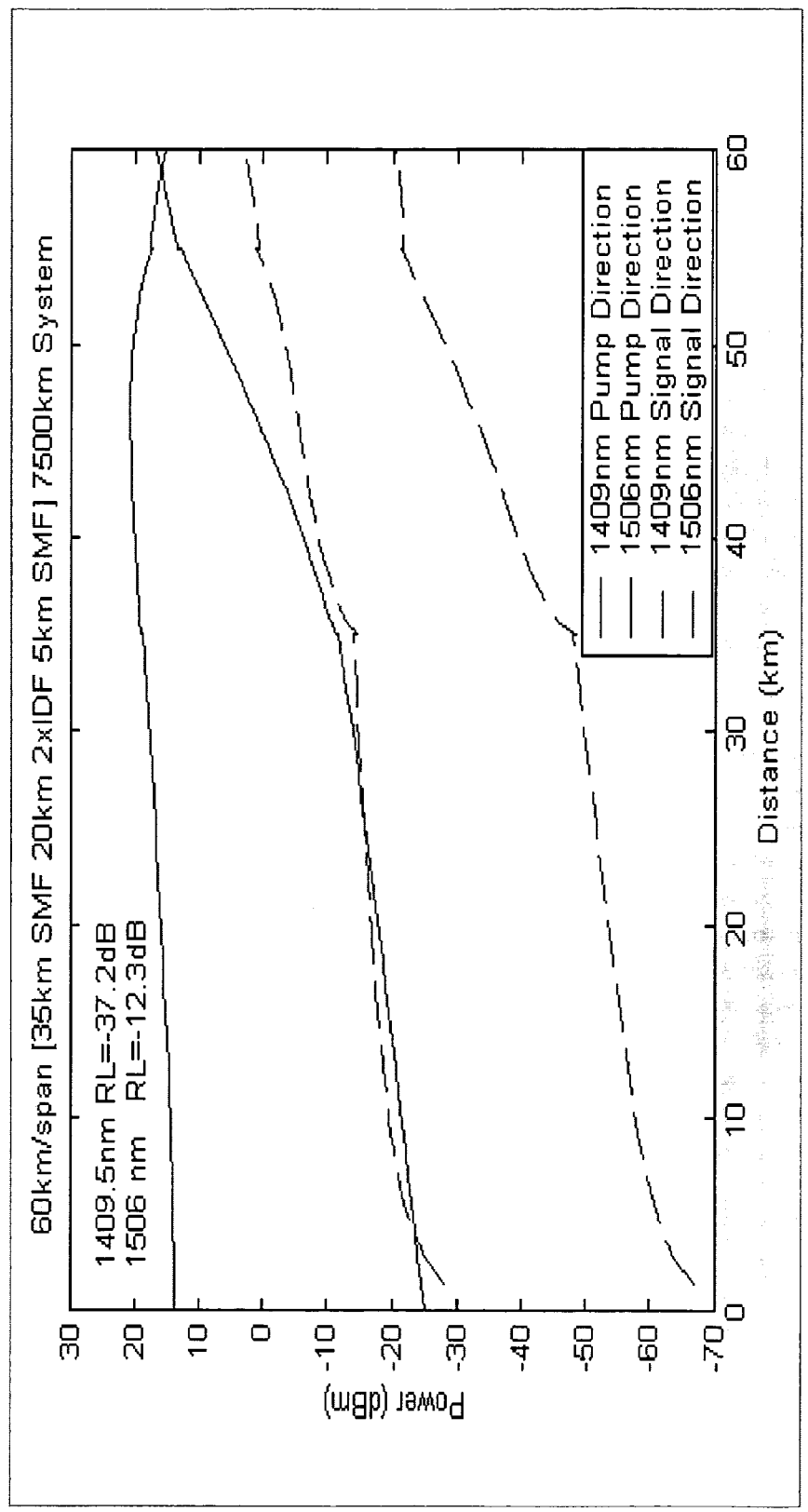
FIG. 20 is a plot of expected pump feedback.

FIG. 20 shows a plot of the expected pump feedback for two pump wavelengths, 1506 nm and 1409 nm. The simulations were made for an ultra-long haul (here, a trans-Atlantic design, being a 7500 km system), where the RL is calculated at the location of a pump signal coupler, such as PSC 525 shown in FIG. 14. Here, the pump feedback for a 60 km span is calculated, where the transmission span includes a first segment being a 35 km span of SMF type fiber, a second segment being a 20 km span of 2xIDF type fiber, and a third segment being a 5 km span of SMF type fiber. In this simulation, the span RL is estimated assuming a Rayleigh backscatter coefficient of −43 dB/km for the SMF fiber and a Rayleigh backscatter coefficient of −36 dB/km for the 2xIDF type fiber (where the Rayleigh backscatter coefficient for the 2xIDF fiber is taken from the report of R. Hainberger et al., OFC 2001, paper MI5). The results show that after 60 km, the 1506 nm RL is about −12.3 dB and the 1409 nm RL is about −37.2 dB. The 1506 nm RL stems from wavelength dependence due to gain from the other pumps, as the fiber loss is the only other wavelength dependent factor included and does not explain the difference.

This span RL can be used in further calculating an estimated feedback at the individual pump source within a pump assembly of a line-quad architecture, where four spans are pumped. Assuming a pump loss of about 8 dB, the expected RL at the 1506 nm pump loss is calculated to be about −22.3 dB, whereas the RL at the 1409 nm pump is about −41.2 dB. As described above, a RL of greater than −30 dB can create significant power fluctuations in the 1506 nm pump source. Thus, this expected feedback value shows that at least a 1506 nm pump source should be isolated for Raman pumping.

As shown in FIG. 16, for a 60 km transmission span, the fiber RL (diamond-shaped symbols) and the RL at the laser (square-shaped symbols) have been measured and estimated for 16 different pump sources (ranging in output wavelength from about 1409 nm to about 1506 nm), in accordance with the experiments described previously. As is shown, the RL at the laser sources is greater than −30 dB for the two longest wavelength pumps, at about 1499 nm and about 1506 nm. Accordingly, these estimations suggest that these longest two pump sources are the most likely candidates for optical isolation. If the system is designed for a ~10 dB margin, then the longest four wavelengths (also including the ~1475 nm pump and the ~1465 nm pump) can be isolated.

The above embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

Figure 21:
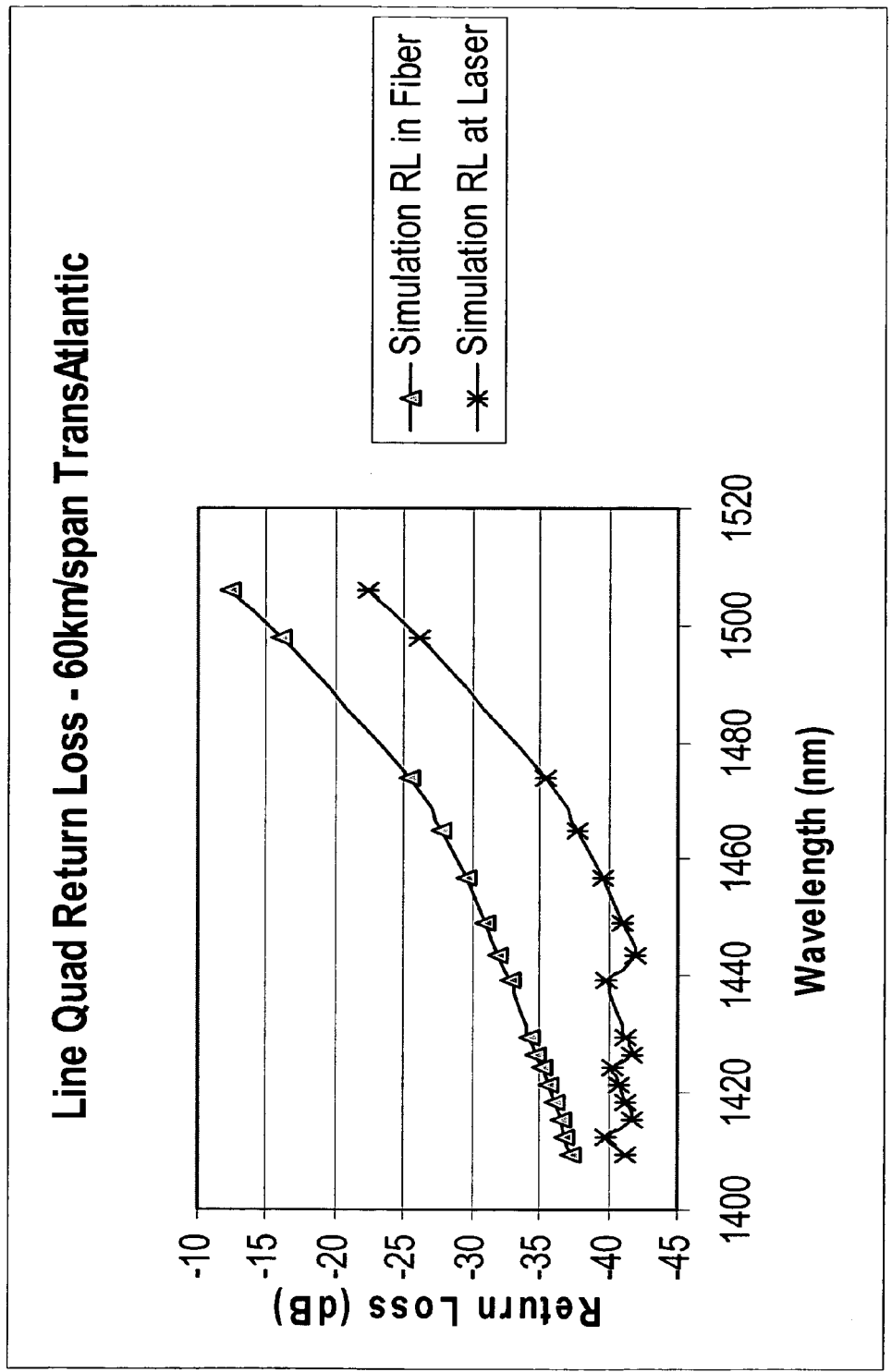
FIG. 21 illustrates Line Quad Return Loss.

FIG. 21 illustrates Line Quad Return Loss in a simulated 60km/span TransAtlantic application. FIG. 21 plots return loss in dB against wavelength in nanometers. FIG. 21 shows two simulations, one being simulation return loss in fiber, and the other being simulation return loss at laser.

Figure 22:
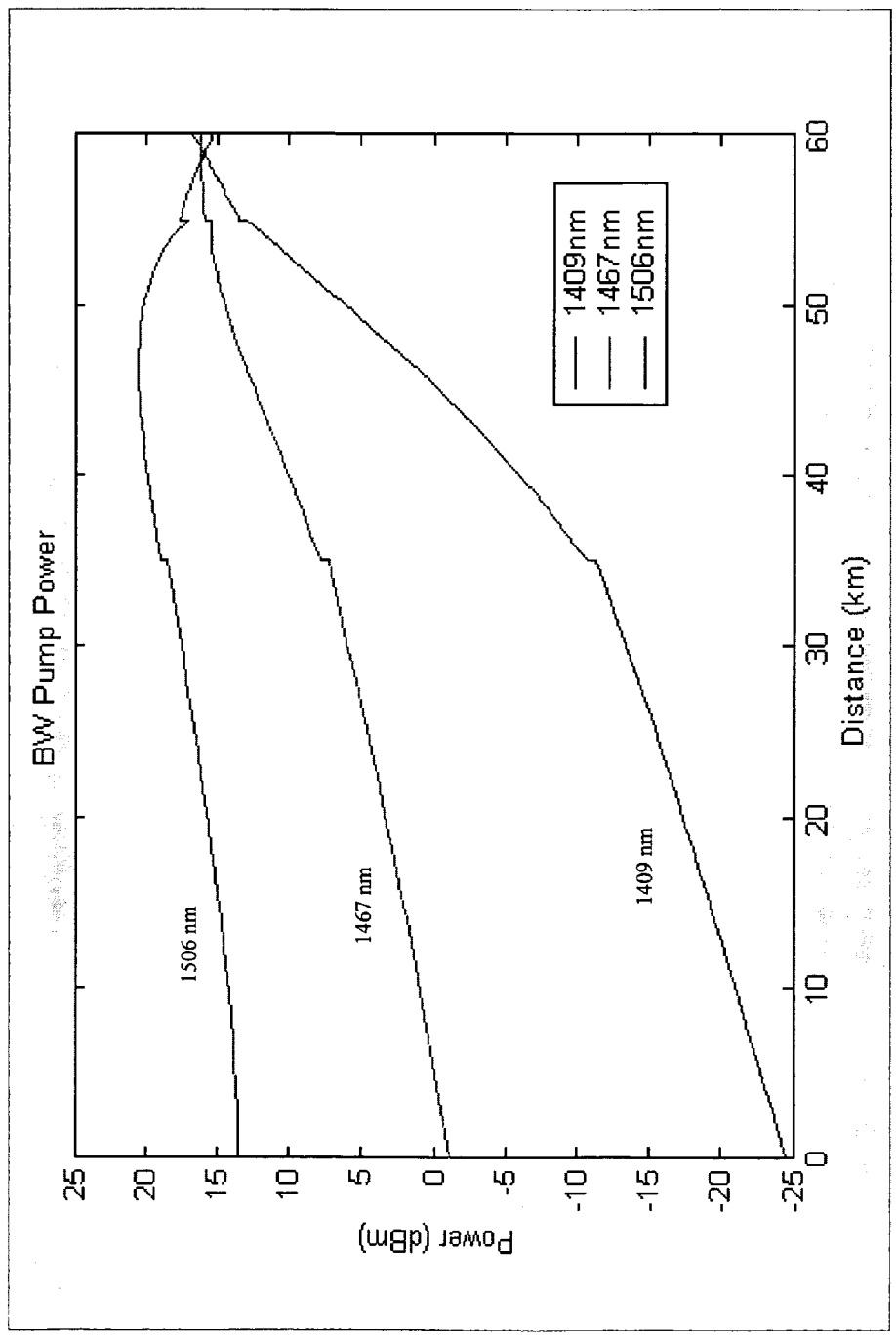
FIG. 22 illustrates BW Pump Power.

FIG. 22 illustrates BW pump power. FIG. 22 plots power in dBm against distance in kilometers. FIG. 22 shows three plots, one at 1506 nm, another at 1467 nm, and the third at 1409 nm.

What is claimed is:

1. An amplifier unit for an optical network, wherein the amplifier unit is coupled to a plurality of optical transmission spans, the amplifier unit comprising:
    a first pump assembly comprising a first pump assembly sub-group, wherein the first pump assembly sub-group includes
    a first set of pump radiation sources for Raman pumping the plurality of optical transmission spans, wherein each pump radiation source is adapted to produce radiation having a pump wavelength and a pump power, and wherein the optical transmission spans are adapted to provide Raman amplification of propagating optical data signals when pumped by the set of pump radiation sources;
    a first optical isolator selectively located within the first pump assembly sub-group between at least one selected pump radiation source and the optical transmission spans to reduce amplified Rayleigh backscatter at the pump wavelength of the selected pump radiation source from feeding back into the selected at least one pump radiation source;
    wherein the first pump assembly further comprises:
    a second pump assembly subgroup, which includes a second set of pump radiation sources for Raman pumping the plurality of optical transmission spans, wherein each pump radiation source is adapted to produce radiation having a pump wavelength and a pump power, and wherein the optical transmission spans are adapted to provide Raman amplification of propagating optical data signals when pumped by the first and second sets of pump radiation sources; and
    a second optical isolator selectively located within the second pump assembly sub-group between at least one second selected pump radiation source, but not all of the pump radiation sources, and the optical transmission spans to reduce amplified Rayleigh backscatter from feeding back into the selected at least one second pump radiation source.

2. The amplifier unit according to claim 1, wherein the first pump assembly further comprises:
    an N×N coupler to couple radiation from the first and second pump assembly sub-groups into each of the plurality of optical transmission spans, wherein the first optical isolator is located between the first selected pump source and the N×N coupler and second optical isolator is located between the second selected pump source and the N×N coupler.

3. The amplifier unit according to claim 1, wherein the first pump assembly sub-group further comprises a second optical isolator, wherein the first optical isolator is disposed between a pump radiation source having a longest wavelength and the optical transmission spans, and the second optical isolator is disposed between a pump radiation source having a second longest wavelength and the optical transmission spans.

4. The amplifier unit according to claim 1, wherein the second pump assembly sub-group further comprises a third optical isolator, wherein the second optical isolator is disposed between a pump radiation source having a longest wavelength and the optical transmission spans, and the third optical isolator is disposed between a pump radiation source having a second longest wavelength and the optical transmission spans.

5. The amplifier unit according to claim 2, wherein the N×N coupler comprises a 4×4 coupler and the number of transmission spans coupled to the amplifier unit comprises four optical transmission spans.

6. The amplifier unit according to claim 5, further comprising a second pump assembly, wherein a radiation output from the first pump assembly is coupled into the optical transmission spans to provide counter-propagating Raman pumping and a radiation output of the second pump assembly is coupled into the optical transmission spans to provide co-propagating auxiliary pumping.

7. The amplifier unit according to claim 2, wherein the optical transmission spans each comprise a first segment providing low non linearity, a third segment providing distributed gain, and a second segment compensating for the dispersion of the first and third segments.

8. The amplifier unit according to claim 7, wherein the optical transmission spans are adapted to propagate an optical data signal having a bandwidth of at least 80 nm.

9. The amplifier unit according to claim 7, wherein the selective locations of the first and second optical isolators are based on the Rayleigh backscatter coefficient of the optical transmission spans.

10. The amplifier unit according to claim 6, wherein the second pump assembly does not include an optical isolator.

11. A method of amplifying an optical data signal along an optical transmission span, comprising:

providing a first pump assembly comprising a first pump assembly sub-group, wherein the first pump assembly sub-group includes a first set of pump radiation sources for Raman pumping the optical transmission span, wherein each pump radiation source is adapted to produce radiation having a pump wavelength and a pump power, and wherein the optical transmission span is adapted to provide Raman amplification of the propagating optical data signal when pumped by the set of pump radiation sources;

selectively disposing a first optical isolator, at a first selective location within the first pump assembly sub-group between at least one selected pump radiation source and the optical transmission spans to reduce amplified Rayleigh backscatter at the pump wavelength of the selected pump radiation source from feeding back into the selected at least one pump radiation source;

providing an output pump from the first pump assembly;

amplifying the optical data signal by coupling the output pump with the optical data signal;

providing a plurality of optical transmission spans, each coupled to the first pump assembly via an N×N coupler, where N is an integer equal to 1 or more;

providing a second pump assembly sub-group, which includes a second set of pump radiation sources for Raman pumping the plurality of optical transmission spans, wherein the optical transmission spans are adapted to provide Raman amplification of propagating optical data signals when pumped by the first and second sets of pump radiation sources; and selectively disposing a second optical isolator at a second selective location within the second pump assembly sub-group between at least one selected pump radiation source, but not all of the pump radiation sources, and the optical transmission spans to reduce amplified Rayleigh backscatter at the pump wavelength of the selected pump radiation source from feeding back into the selected at least one pump radiation source.

12. The method according to claim 11, wherein the selectively disposing step further comprises disposing the first optical isolator at a location within the first pump assembly sub-group between a pump radiation source with a longest wavelength and the optical transmission span.

13. The method according to claim 12, wherein the selectively disposing step further comprises disposing a second optical isolator at a location within the first pump assembly sub-pump between a pump radiation source with a second longest wavelength and the optical transmission span.

14. The method according to claim 13, wherein the selectively disposing step further comprises disposing a third optical isolator at a location within the first pump assembly sub-group between a pump radiation source with a third longest wavelength and the optical transmission span.

15. The method of claim 11, further comprising:

mapping the optical transmission span as a plurality of fiber segments; and selecting a different fiber for each of the segments so that a first segment provides low non linearity, a third segment provides distributed gain, and a second segment compensates for the dispersion of the first and third segments.

16. The method according to claim 15, further comprising:

determining a return loss of the optical transmission span based on a wavelength of at least one pump source; and determining a return loss at each corresponding pump source location based on the return loss of the span, wherein the selectively disposing step comprises disposing the first optical isolator at the first selective location within the first pump assembly sub-group between at least one selected pump radiation source and the optical transmission span based on the determined return loss at the first pump source location.

17. The method according to claim 16, wherein the selectively disposing step further comprises disposing an optical isolator at each pump source location within the first pump assembly where the determined return loss is greater than or equal to −30 dB.

* * * * *